United States Patent
Jiao et al.

(10) Patent No.: US 10,855,965 B1
(45) Date of Patent: Dec. 1, 2020

(54) DYNAMIC MULTI-VIEW RENDERING FOR AUTOSTEREOSCOPIC DISPLAYS BY GENERATING REDUCED NUMBER OF VIEWS FOR LESS-CRITICAL SEGMENTS BASED ON SALIENCY/DEPTH/EYE GAZE MAP

(71) Applicant: Hong Kong Applied Science and Technology Research Institute Company, Limited, Hong Kong (HK)

(72) Inventors: Yuzhong Jiao, Hong Kong (HK); Man Chi Chan, Hong Kong (HK); Ping Chan Mok, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 35 days.

(21) Appl. No.: 16/456,053

(22) Filed: Jun. 28, 2019

(51) Int. Cl.
  *H04N 13/111* (2018.01)
  *H04N 13/00* (2018.01)
  (Continued)

(52) U.S. Cl.
  CPC ......... *H04N 13/111* (2018.05); *H04N 13/156* (2018.05); *H04N 13/271* (2018.05);
  (Continued)

(58) Field of Classification Search
  CPC .. H04N 13/111; H04N 13/305; H04N 13/271; H04N 13/383; H04N 13/156;
  (Continued)

(56) References Cited

U.S. PATENT DOCUMENTS 5,917,962 A * 6/1999 Chen ...................... G06T 9/007
                                                    382/176
6,594,083 B1   7/2003 Raber
(Continued)

FOREIGN PATENT DOCUMENTS

CN   103179405 A   6/2013
CN   104023220 A   9/2014
CN   107248139 A   10/2017

OTHER PUBLICATIONS

Dinstein et al., "Compression of stereo images and the evaluation of its effects on 3-D perception", SPIE 1153, 1989.
(Continued)

*Primary Examiner* — Bobbak Safaipour
(74) *Attorney, Agent, or Firm* — Stuart T. Auvinen; gPatent LLC

(57) ABSTRACT

A segmented 3D multi-view image generator generates fewer multi-view view images for partitions having less salient features. Saliency values are calculated based on a depth map and image processing of the input image. The saliency values are compared to thresholds to map pixel locations to first, second, and third partitions. First, second, and third segmented images are created from the input image using a partition map. A multi-view generator uses the depth map and viewer eye locations to generates 28 view images from the first segmented image, 14 unique view images from the second segmented image that are replicated to 28 view images, and 7 unique view images from the third segmented image that are replicated to 28 view images. The view images for each segment are interlaced to generated interlaced segmented images that are then integrated together into a single 3D image that drives a 28-view autostereoscopic display.

20 Claims, 29 Drawing Sheets

(51) Int. Cl.
*H04N 13/156* (2018.01)
*H04N 13/305* (2018.01)
*H04N 13/271* (2018.01)
*H04N 13/383* (2018.01)
*H04N 13/324* (2018.01)

(52) U.S. Cl.
CPC ......... *H04N 13/305* (2018.05); *H04N 13/324* (2018.05); *H04N 13/383* (2018.05); *H04N 2013/0081* (2013.01); *H04N 2013/0092* (2013.01)

(58) Field of Classification Search
CPC ......... H04N 13/324; H04N 2013/0092; H04N 2013/0081
See application file for complete search history.

(56) References Cited

U.S. PATENT DOCUMENTS

| | | | |
|---|---|---|---|
| 9,407,896 B2 | 8/2016 | Lam et al. | |
| 9,712,810 B2* | 7/2017 | Smithwick | H04N 13/383 |
| 2003/0039402 A1* | 2/2003 | Robins | G06T 5/005 |
| | | | 382/275 |
| 2004/0174378 A1* | 9/2004 | Deering | G06T 11/40 |
| | | | 345/611 |
| 2015/0029317 A1 | 1/2015 | Kim et al. | |
| 2015/0110372 A1* | 4/2015 | Solanki | G06F 19/321 |
| | | | 382/130 |
| 2015/0269737 A1 | 9/2015 | Lam et al. | |
| 2017/0053178 A1* | 2/2017 | Robles-Kelly | H04N 1/6086 |

OTHER PUBLICATIONS

Hung et al., "Transform-domain super-resolution for multi-view images using depth information", EUSIPCO 2011.

Lew Stelmach et al., "Stereo image quality: effects of mixed spatio-temporal resolution", IEEE Trans. Circuits Syst. Video Technol., vol. 10 No. 2, Mar. 2000.

Stelmach & Tam, "Stereoscopic image coding: Effect of disparate image-quality in left- and right-eye views", Signal Processing: Image Commun., vol. 14, 1998.

Yuzhong Jiao, Man Chi Chan, & Mark, P.C. Mok, "Saliency Map Based Multi-View Autostereoscopic Displays", IS&T Int'l Sym Elect Imaging 2019, Jan. 2019.

Yuzhong Jiao, Man Chi Chan, & Mark, P.C. Mok, "Dynamic Multi-View Autostereoscopy", IS&T Int'l Sym Elect Imaging 2019, Jan. 2019.

* cited by examiner

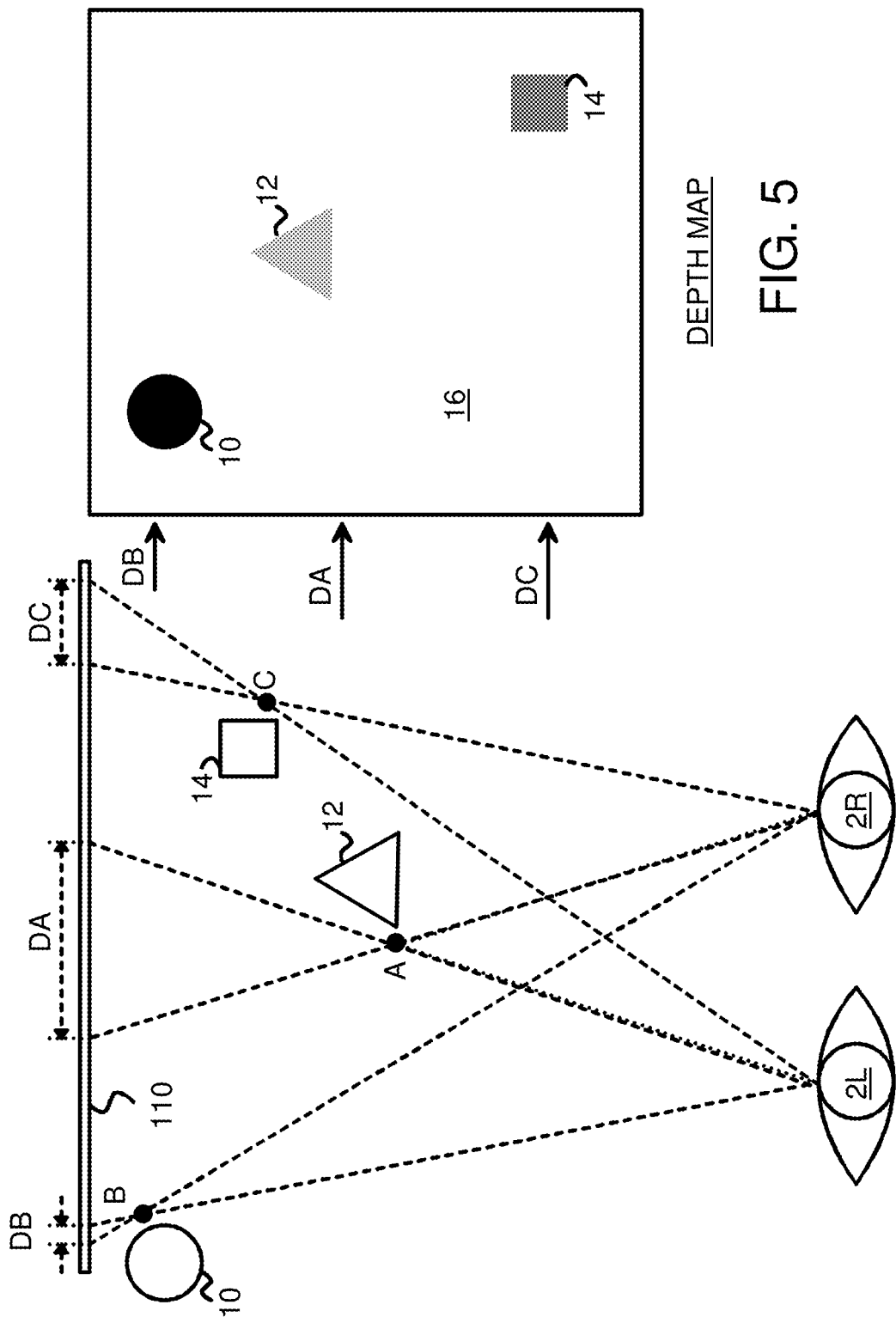

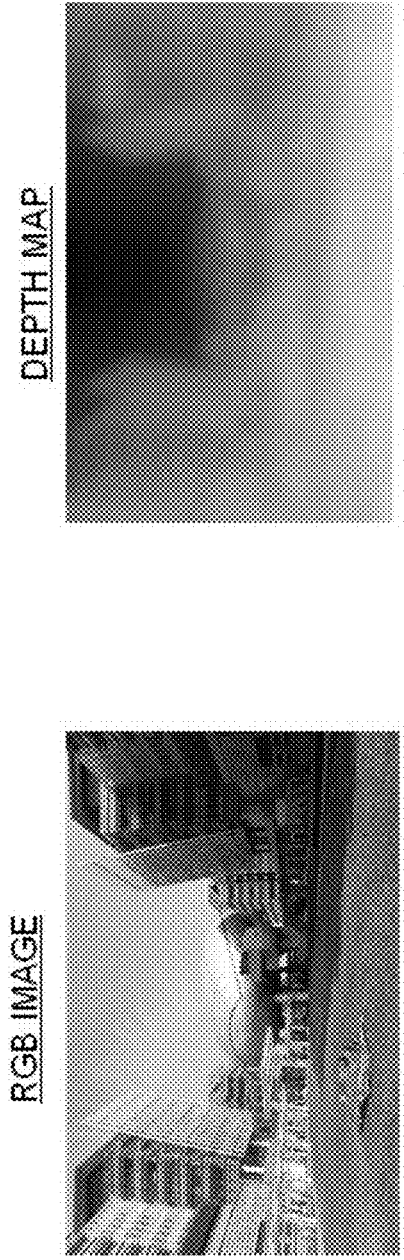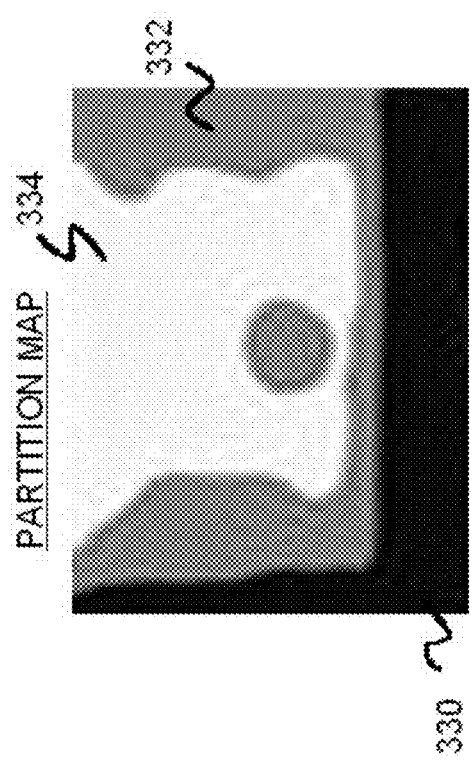
FIG. 8A
FIG. 8B
FIG. 8C

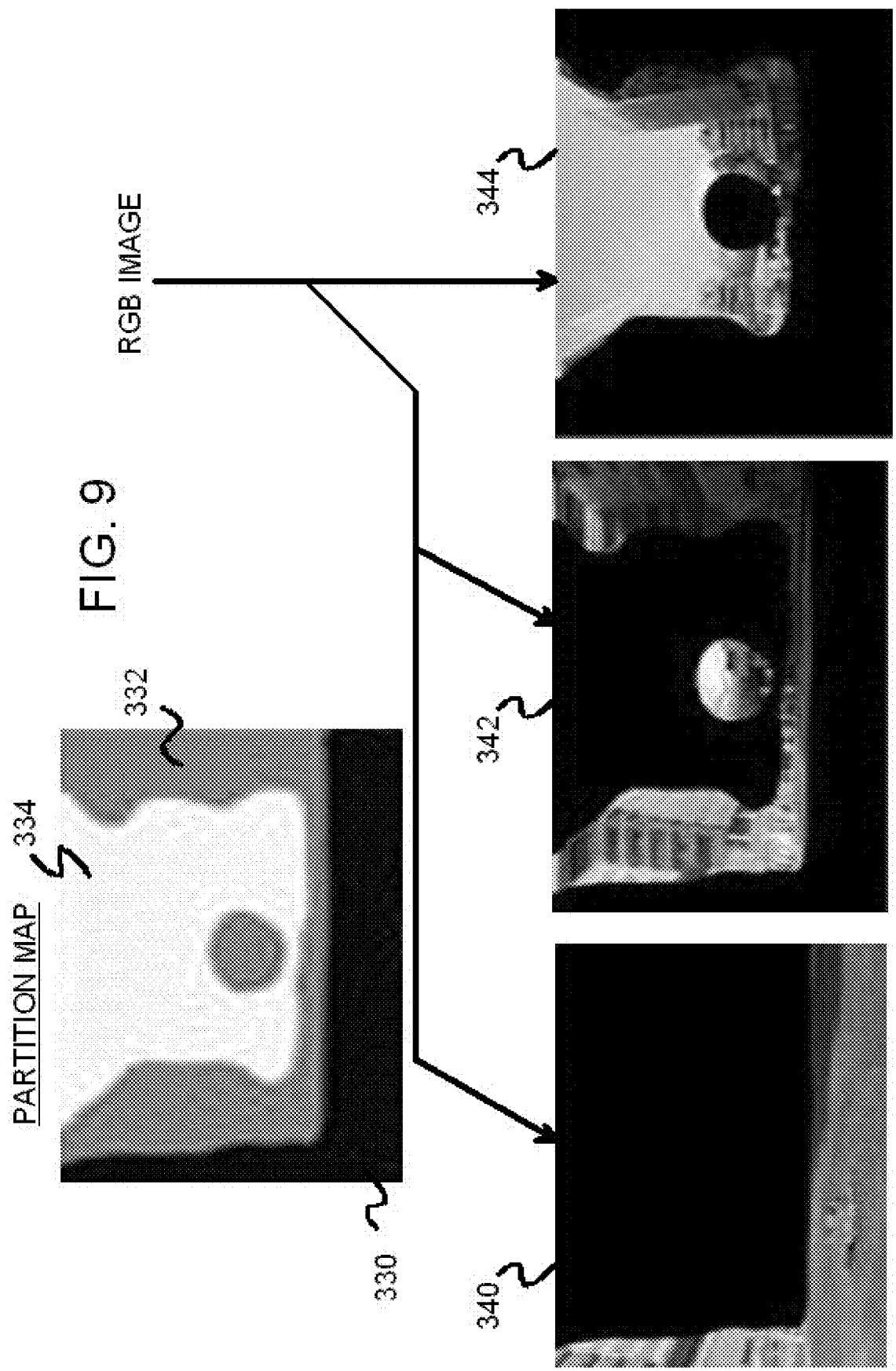

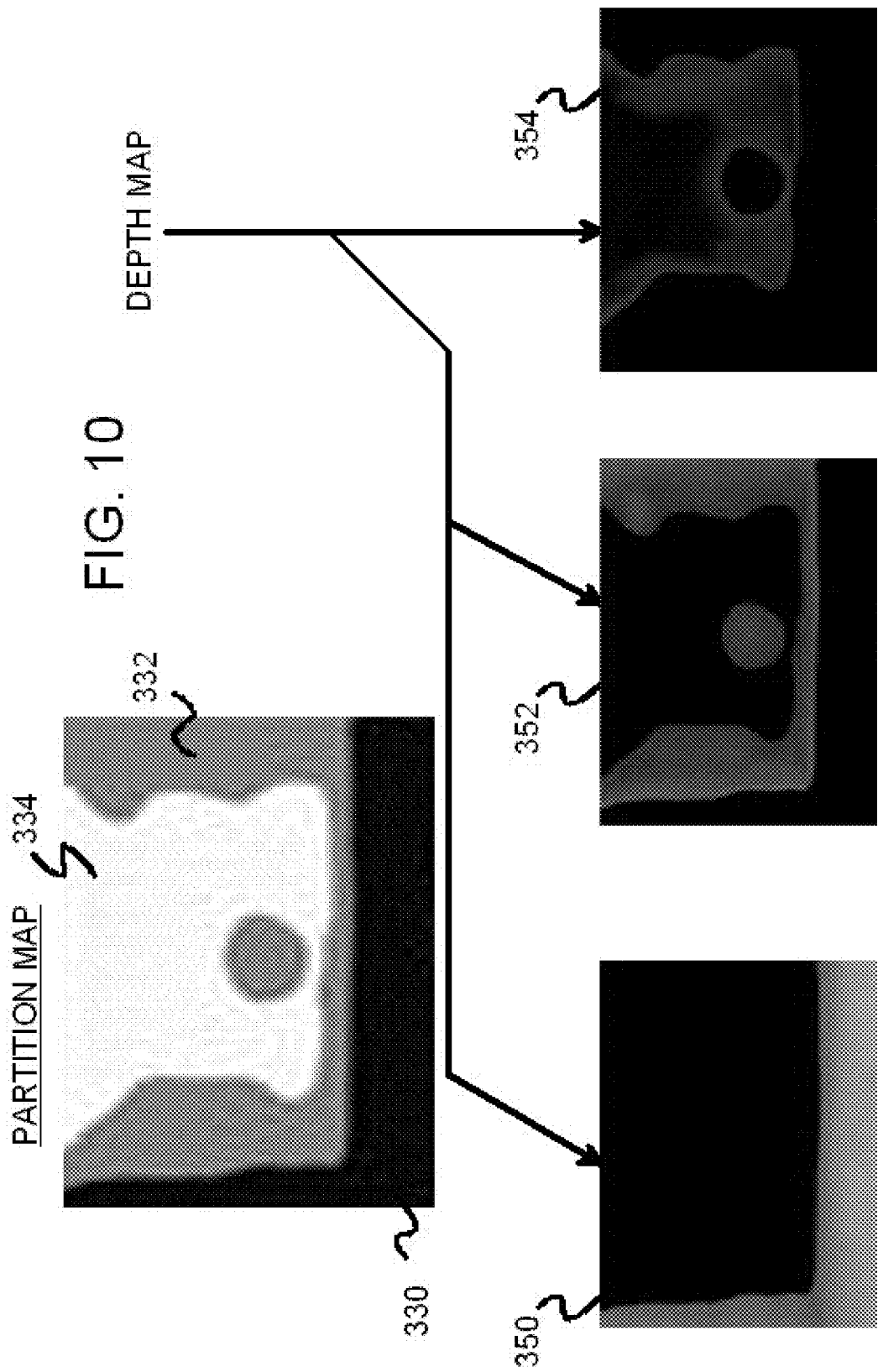

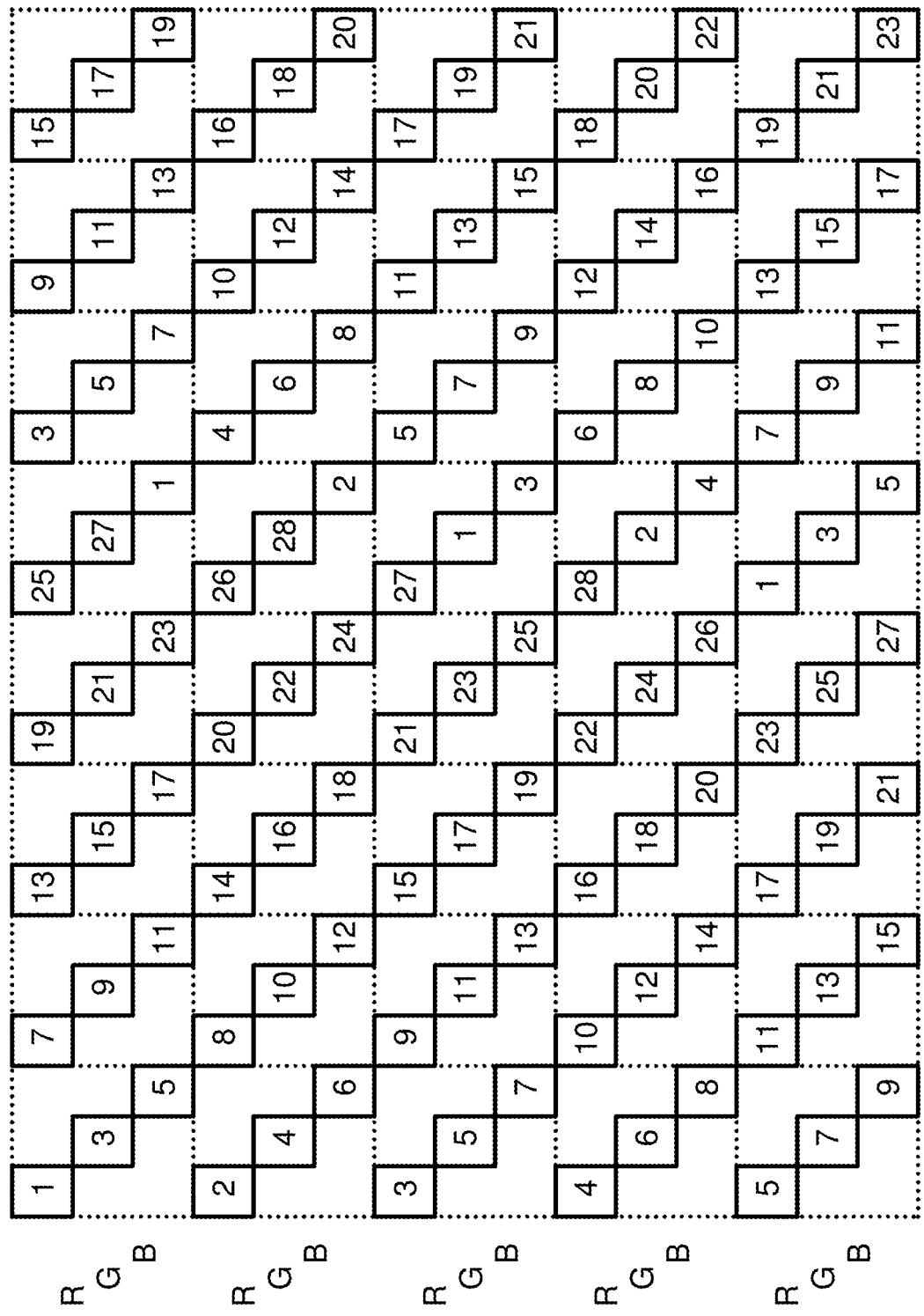
FIG. 13A    <u>28 VIEWS INTERLACED</u>

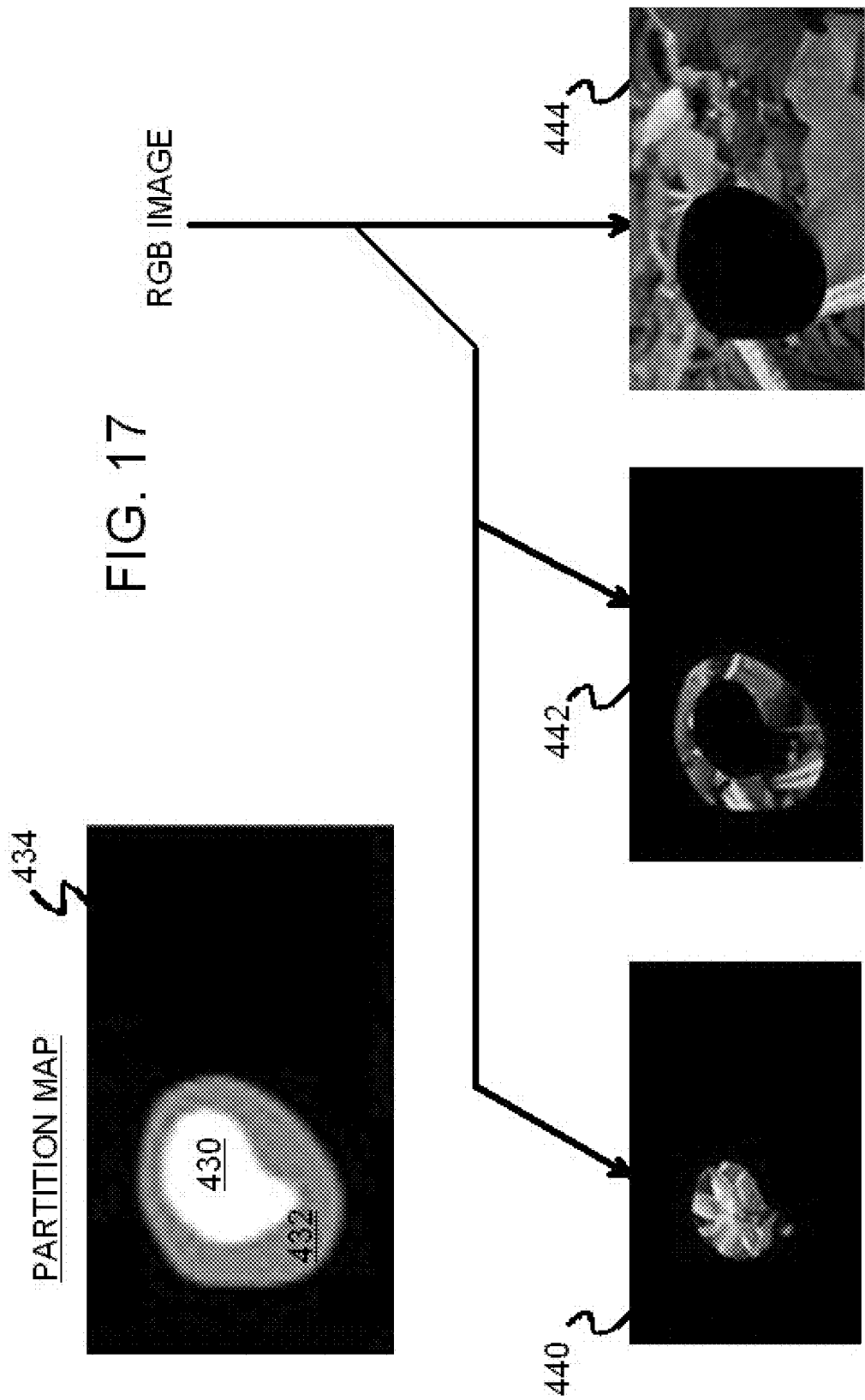

FIG. 18
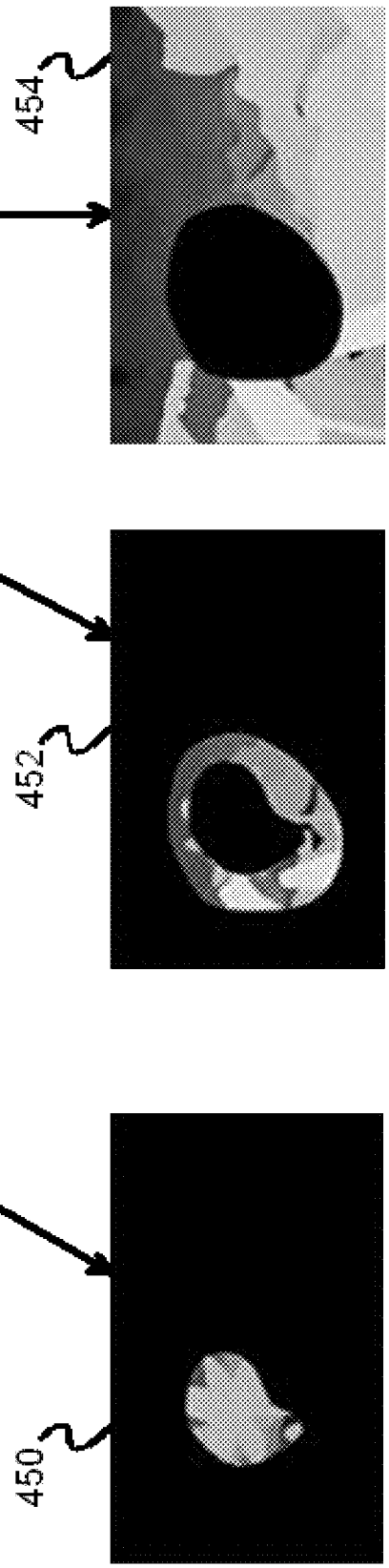
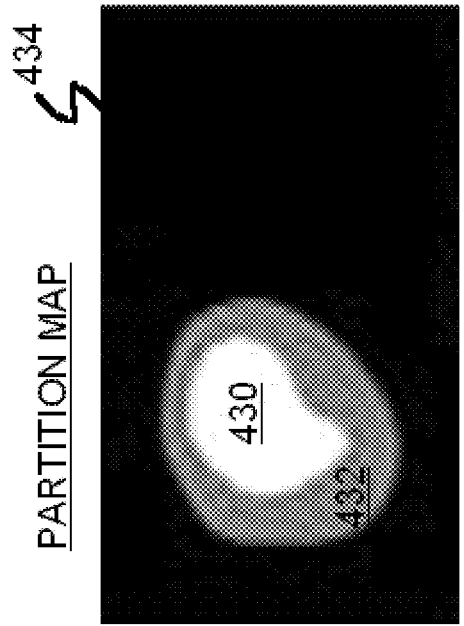

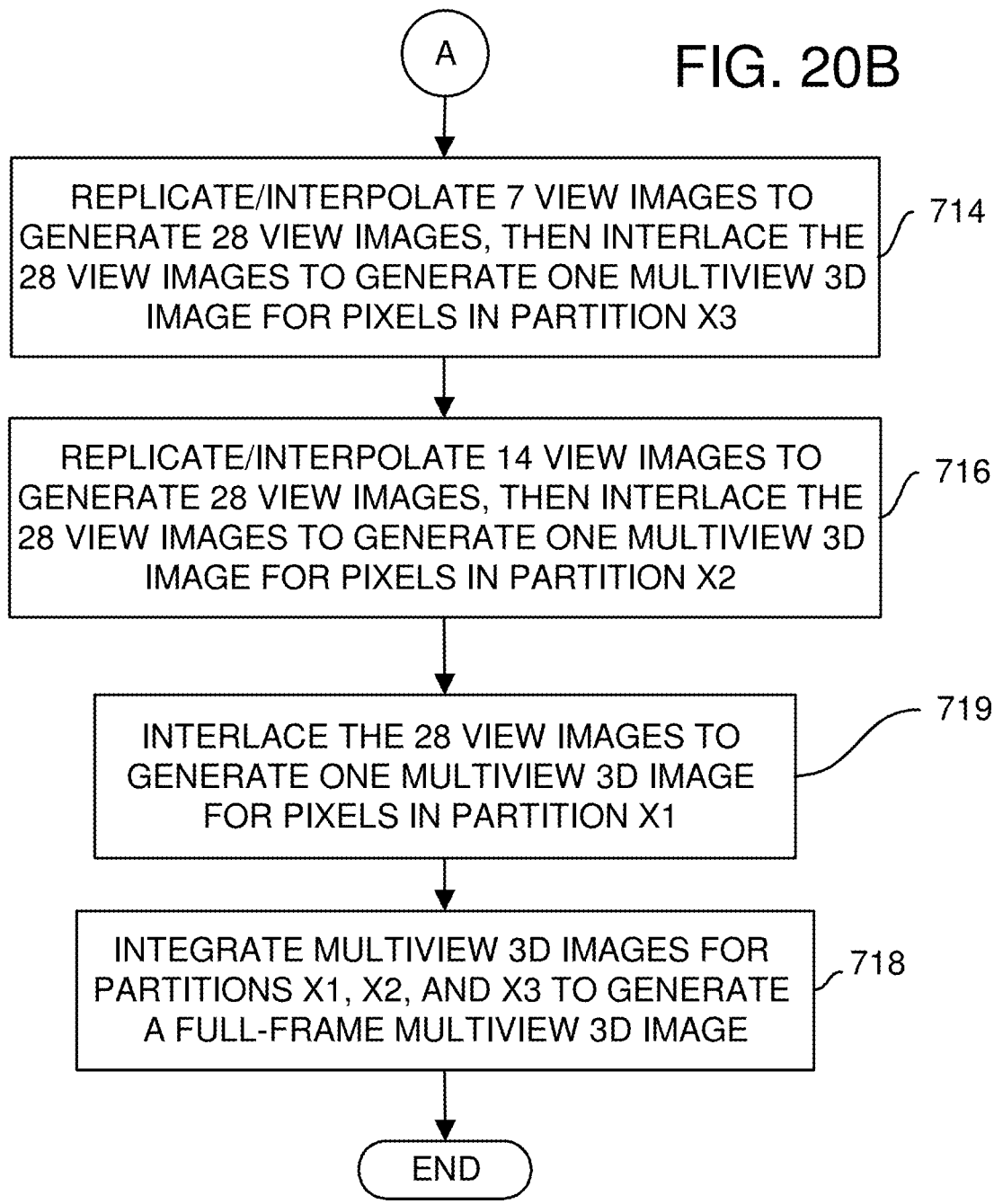

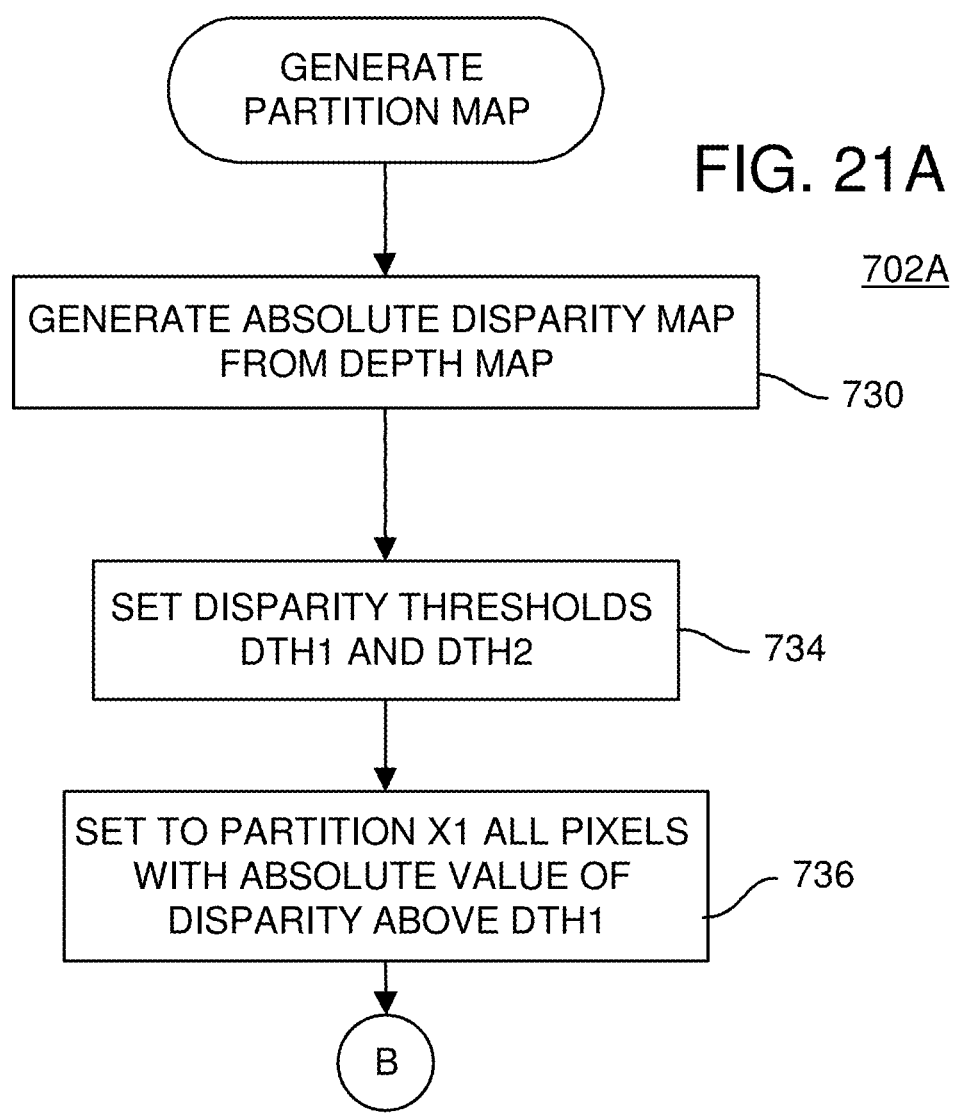

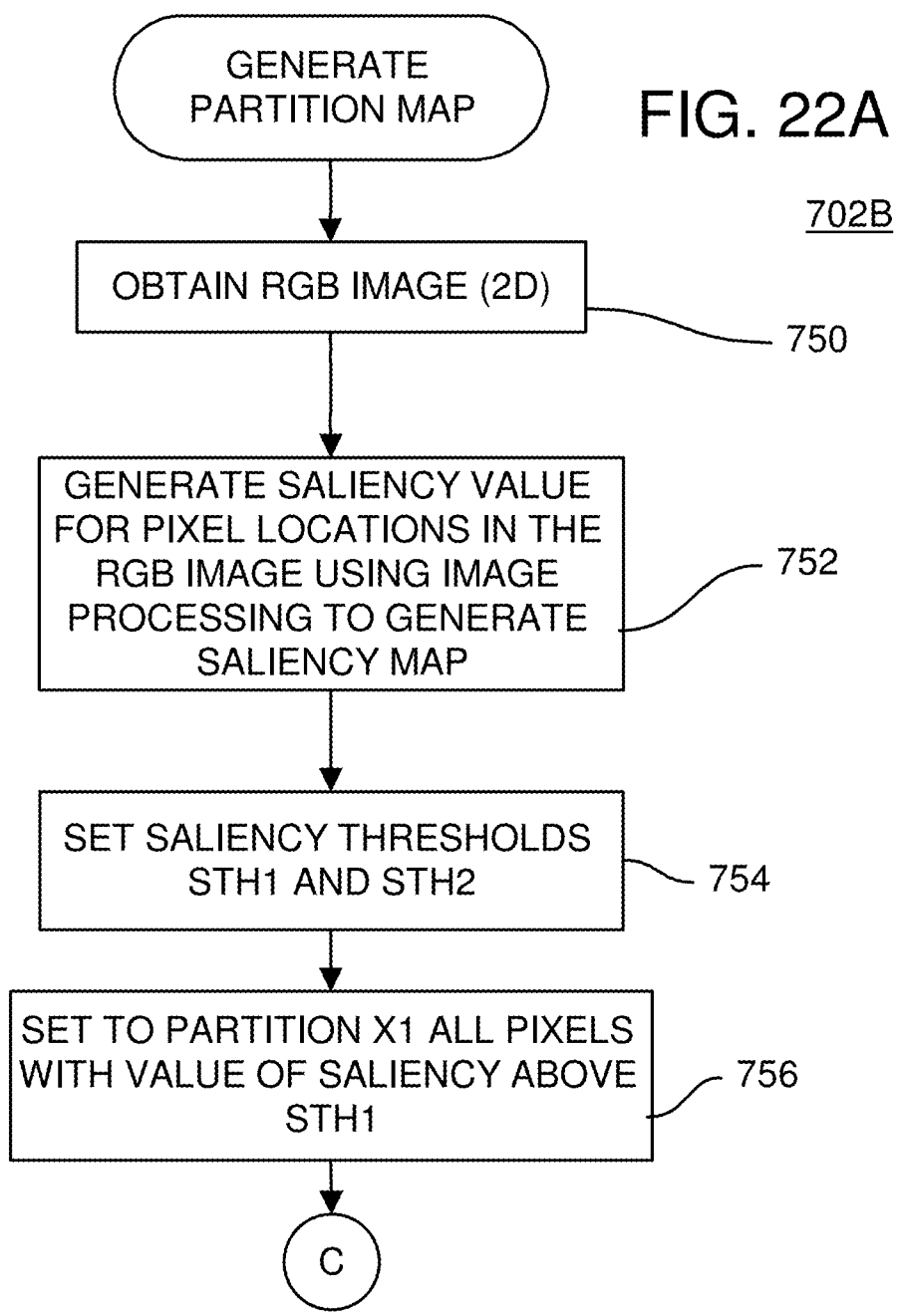

DYNAMIC MULTI-VIEW RENDERING FOR AUTOSTEREOSCOPIC DISPLAYS BY GENERATING REDUCED NUMBER OF VIEWS FOR LESS-CRITICAL SEGMENTS BASED ON SALIENCY/DEPTH/EYE GAZE MAP

FIELD OF THE INVENTION

This invention relates to 3D graphics systems, and more particularly to multiview generation for autostereoscopic displays.

BACKGROUND OF THE INVENTION

The appearance of 3D depth can be provided to a viewer by displaying two different stereo views, one to each eye. Special 3D glasses or headgear have been used to send one stereo view to one eye, and a different view to the other eye. Modern 3D headgear may block all other light except for the two stereoscopic images placed directly in front of the viewer's eyes, such as by using two small display panels. As the viewer rotates and moves his head, the stereoscopic images change to provide the illusion of an immersive experience.

While such 3D glasses and headgear are useful, they are often bulky and uncomfortable. Each viewer has to put on his own headgear, and possibly wait to share a headset once another viewer has finished. Thus 3D headgear adds some inconvenience compared to viewing a standard 2D image on a panel display. The number of viewers is limited by the number of headsets, while a traditional 2D display can simultaneously display a 2D image to a large number of viewers without any delay to install 3D headgear.

Some stereoscopic display systems do not require each viewer to wear 3D glasses or a 3D headset. Instead, the display panel is able to display multiple views, and different ones of these multiple views reach the viewer's two eyes. Rather than using 3D glasses, the stereoscopic display bends light from the different views so that one view reaches one eye, and a different view reaches the other eye.

FIG. 1 shows an autostereoscopic display using a parallax barrier to create a 3D effect. Multi-view display 102 displays pixels from four different views V0, V1, V2, V3. The different views are displayed in different regions on the display. Parallax barrier 106 has small slats that allow light to pass through at certain angles but blocks light at other angles. Parallax barrier 106 blocks the viewer from seeing all views at once, and causes the viewer's eyes 2L, 2R to see different views being displayed on autostereoscopic display 102.

For example, the viewer's left eye 2L can only see view V2. Other views V0, V1, V2 are blocked by parallax barrier 106. The viewer's right eye 2R is in a different physical location than left eye 2L, so right eye 2R sees a different view V1. Views V0, V2, V3 are blocked by parallax barrier 106 from reaching right eye 2R.

Such multi-view autostereoscopic displays using a parallax barrier have the disadvantage that light or brightness of the display is reduced. Parallax barrier 106 blocks some of the display light, dimming the appearance of the display.

FIG. 2 shows an autostereoscopic display using a lenticular lenses to display different views to the users' eyes. The parallax barrier can be replaced with lenticular lenses 104. A one-dimensional array of small cylindrical lenses can be placed over multi-view display 102 to replace the line and space pairs of parallax barrier 106. In addition to avoiding the light loss of parallax barrier 106, using lenticular lenses 104 is less restrictive of the physical location of the viewers since light is being bended rather than blocked.

Light from multi-view display 102 is bent by lenticular lenses 104. The angle that the light is bent depends on the location of the pixels on multi-view display 102. Thus pixels in the regions of view V0 and view V3 are bent and sharp angles since they are near the edges of a lens within lenticular lenses 104. Light from pixels in views V1, V2 are bent at a shallower angle than views V0, V3.

A viewer standing near the middle of multi-view display 102 is able to see view V2 in his left eye 2L, and see view V1 in his right eye 2R. Views V0 and V3 are not visible from the viewer's current location. If this viewer were to move to the left, then he would see view V3 in his left eye 2L and view V2 in his right eye 2R. Motion parallax occurs when the viewer moves since different views become visible, depending on the angle to multi-view display 102.

Multiple viewers can simultaneously view multi-view display 102. Since each viewer is located at a different physical location in front of multi-view display 102, the viewers will see different pairs of the multiple views displayed on multi-view display 102, depending on their locations. The 3D effect can be immediately visible as the viewers walk by multi-view display 102 since 3D headgear or glasses do not need to be installed. Such glassesless or glasses-free 3D is thus desirable.

Multi-view autostereoscopic displays show immersive three-dimensional (3D) images without the need for the viewer to wear glasses or headgear. Especially as the number of views displays is increased, such multi-view autostereoscopic displays can make full use of various depth cues, including stereo parallax, motion parallax, vergence and accommodation.

Traditional autostereoscopic displays usually have fewer than ten views. With advances in computer graphics and display technologies, autostereoscopic displays with tens of views have been manufactured in recent years. In principle, increasing of the number of views improves the quality of 3D images or 3D videos, provides very smooth movement parallax, and achieves better viewing comfort.

However huge amounts of computing resources are needed to generate the large numbers of view images in real time. The required computational effort makes the commercialization of autostereoscopic display very challenging.

What is desired is a multi-view display generator for a multi-view autostereoscopic display. It is desired to reduce the computing resources required to generate the multiple horizontal-parallax views that are displayed on an autostereoscopic display. A dynamic rendering technique for autostereoscopic displays is desired to reduce the computational effort and cost.

BRIEF DESCRIPTION OF THE DRAWINGS

FIG. 4 shows objects at different depths with different disparities.

FIG. 5 shows a depth map that is generated from the disparities of FIG. 4.

FIGS. 8A-8C show generation of a partition map from a depth map.

FIG. 9 shows the partition map being used to segment the RGB image.

FIG. 10 shows the partition map being used to segment the depth map.

FIGS. 13A-13B illustrate sub-pixel interlacing.

FIG. 17 shows the partition map being used to segment the RGB image.

FIG. 18 shows the partition map being used to segment the depth map.

FIGS. 20A-20B show a routine for a saliency-segmented multi-view image generator for a multi-view autostereoscopic display.

FIGS. 21A-21B show generating a partition map from a depth map using disparity values.

FIGS. 22A-22B show generating a partition map from a saliency map.

DETAILED DESCRIPTION

The present invention relates to an improvement in 3D multi-view rendering. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

Figure 1:
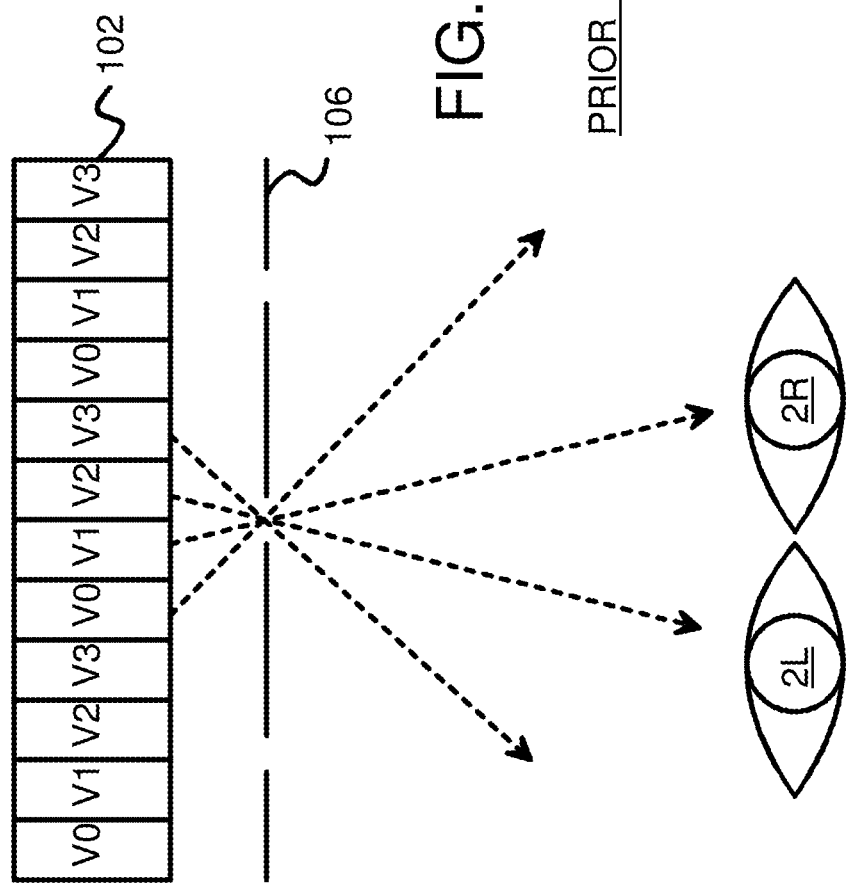
FIG. 1 shows an autostereoscopic display using a parallax barrier to create a 3D effect.
Figure 2:
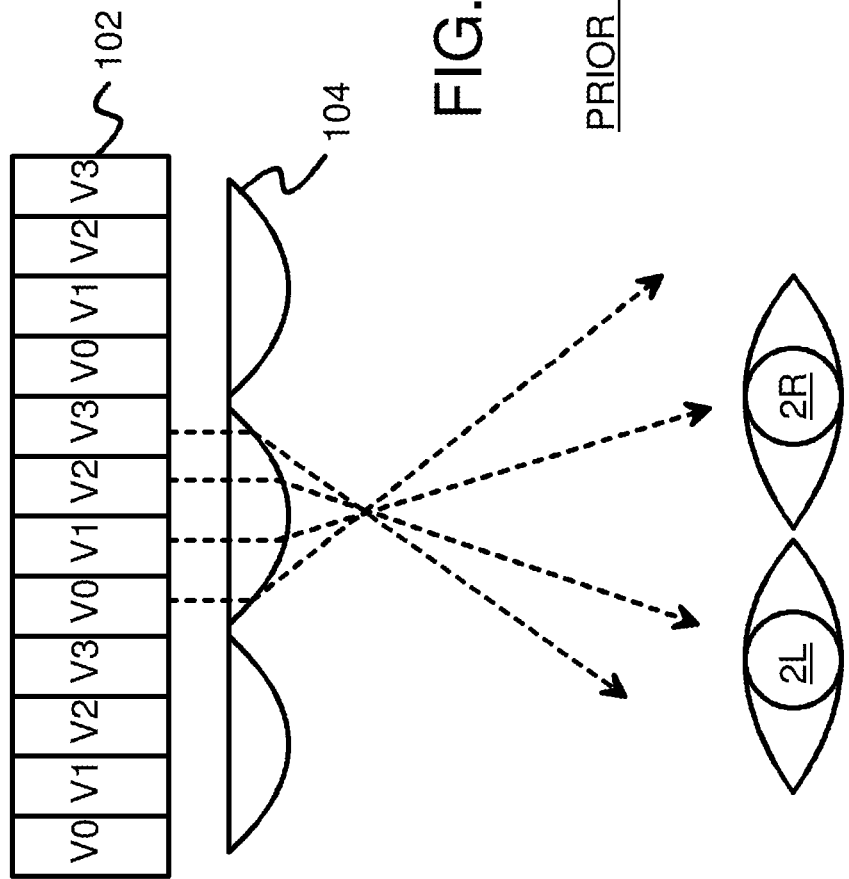
FIG. 2 shows an autostereoscopic display using a lenticular lenses to display different views to the users' eyes.
Figure 3:
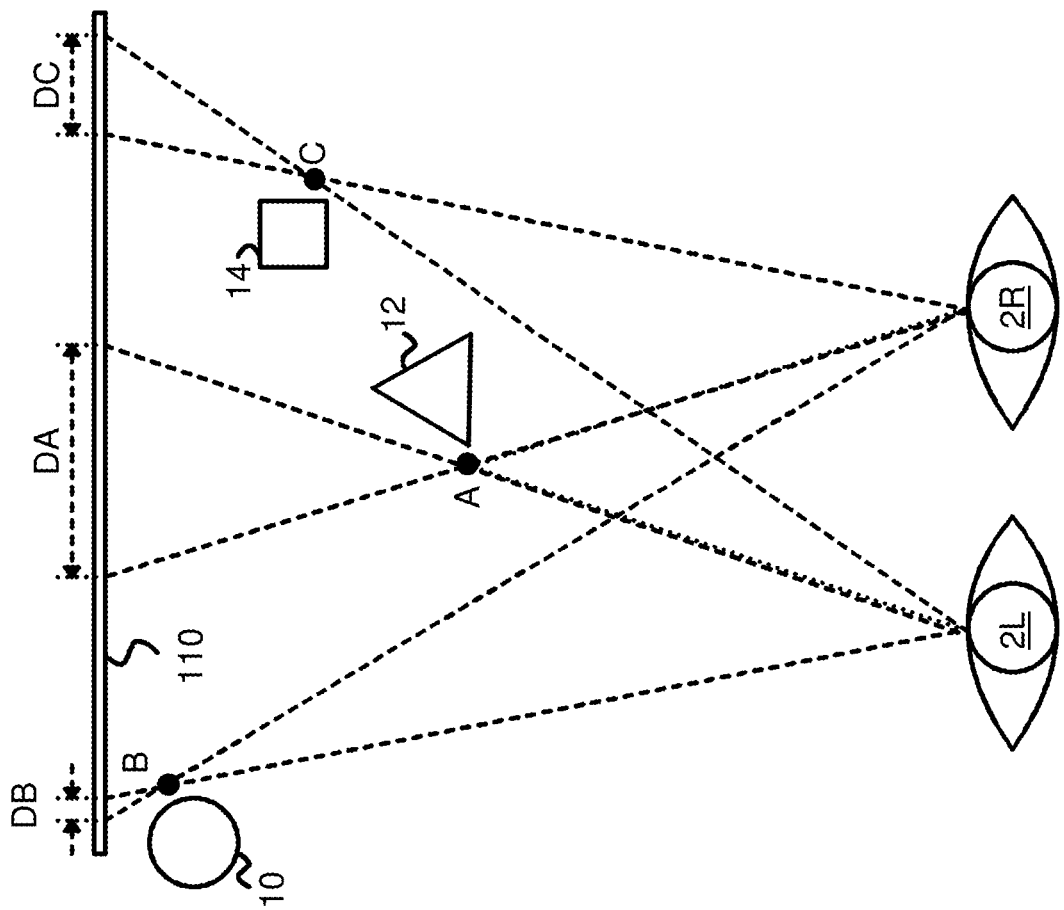
FIG. 3 highlights disparity for objects having different depths.

FIG. 3 highlights disparity for objects having different depths. When objects are viewed from multiple viewpoints, such as from a person's two eyes, then these objects may shift in their apparent position on a 2D screen projection. The disparity is the positional difference of two pixels that display one spatial point.

Screen 110 is the apparent location of the autostereoscopic display screen within the virtual 3D space. Points A, B, and C are at different depths from screen 110, but point B is behind point C, and both are behind point A.

Point B is very close to screen 110 and has near-zero disparity DB. Both eyes 2L, 2R see point B at about the same location on screen 110, with no significant parallax or apparent movement when viewed with either eye 2R or eye 2L.

When projected onto screen 110, point A is seen at the left position on screen 110 by eye 2R, and at a right position on screen 110 by eye 2L. The difference in these 2 positions that point A appears to be at on screen 110 is the disparity of point A, DA.

Similarly, point C is seen at two different positions on screen 110 by eyes 2L, 2R, with the difference in these projections on screen 110 as disparity DC. Since point C is closer to screen 110 than is point A, the disparity of point C, DC, is less than the disparity of point A, or DA>DC.

The disparity depends on the distance of a point to screen 110. Screen 110 could be placed at different depths within the virtual 3D space, which would change the disparities.

FIG. 4 shows objects at different depths with different disparities. Object 12 is located near point A and has the largest disparity DA when projected onto screen 110. Object 10 is near point B and screen 110 and has little or no disparity DB. Object 14 is near point C and is closer to screen 110 than object 12, and so object 14 has a moderate disparity DC. It can be seen in FIG. 4 that DA is much larger than DC, since the apparent movement or shift along screen 110 when viewed from two different perspectives of eyes 2L, 2R is largest for DA.

These apparent disparities can be generated from a depth map. FIG. 5 shows a depth map that is generated from the disparities shown in FIG. 4. Depth map 16 has object 10 being the darkest, indicating that object 10 is the farthest away from the viewer, or has the greatest depth. Object 14 is moderately dark in depth map 16, indicating that it is moderately far from the viewer. Object 12 is closest to the viewer, and is the lightest object in depth map 16.

While disparities depend on the location or depth of screen 110, depth map 16 has no dependency on the location of screen 110. Multi-view images can be generated from depth map 16 and the image data, using locations of the viewers' eyes (or other viewpoints) to shift objects as a function of their depths.

Figure 6:
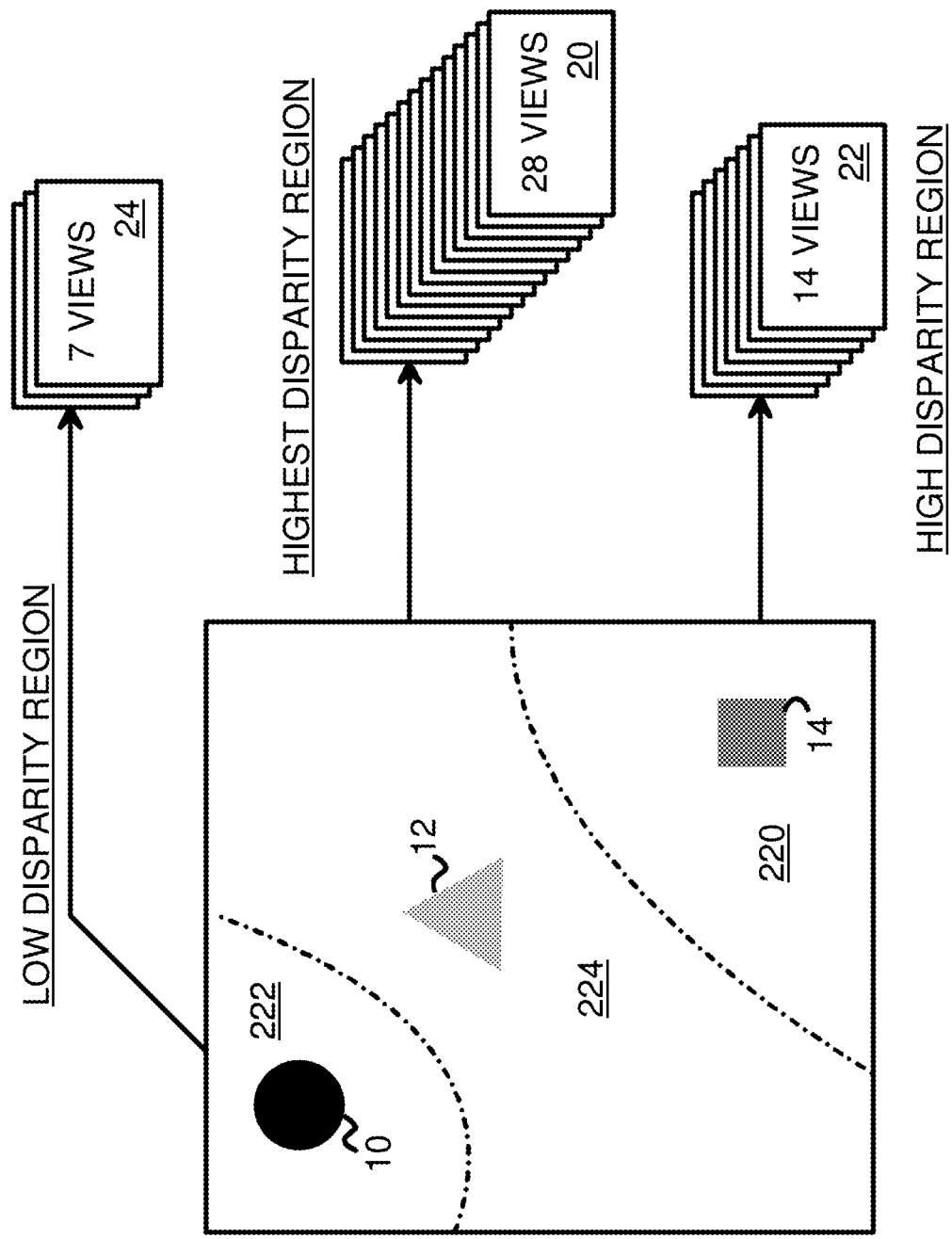
FIG. 6 shows that more views are generated for image regions having high disparity while fewer view images are generated for low disparity regions.

FIG. 6 shows that more views are generated for image regions having high disparity while fewer multi-view images are generated for low disparity regions. High disparity regions have larger apparent shifts or parallax than do low-disparity regions. Objects may not appear to shift at all in low-disparity regions, so fewer views are needed.

The inventors have realized that areas with high image disparity are more sensitive to 3D effects and greatly benefit from additional multi-view images, while areas with low disparity are less sensitive to 3D effects and do not require many multiple views.

The inventors realize that computing resources can be reduced by generating many view images for high disparity regions of the image, while generating fewer view images for low disparity image regions.

In FIG. 6, object 10 has a low disparity. Object 10 does not move around much due to parallax of different viewpoints, so fewer view image are needed. Object 10 and other nearby pixels in low disparity region 222 have only 7 view images 24 generated.

Object 14 has a moderate disparity and has a visible shift in apparent location among different viewpoints. Object 14 and the surrounding area in the image are defined as high disparity region 220. Pixels within high disparity region 220 have 14 view images 22 generated.

Object 12 has the highest disparity since it is so close to the viewer and far from screen 110. Object 12 and its surrounding pixels are placed into highest disparity region 224, and 28 multi-view images 20 are generated for highest disparity region 224.

Generating fewer view images for low disparity regions helps to reduce computational work. Since the parallax is low for low disparity objects, the loss of 3D effect is negligible and likely not noticeable to a viewer.

More view images are generated for objects that have higher disparities, and thus have larger parallax movements. Using more view images for these objects improves the 3D appearance of these objects.

The most view images are generated for objects with the highest disparities. These objects have noticeably large parallax movements among the different viewpoints. Using many view images for these in-your-face 3D objects such as closest object 12 helps improve the clarity and crispness of the 3D effects for these very noticeable objects.

Figure 7:
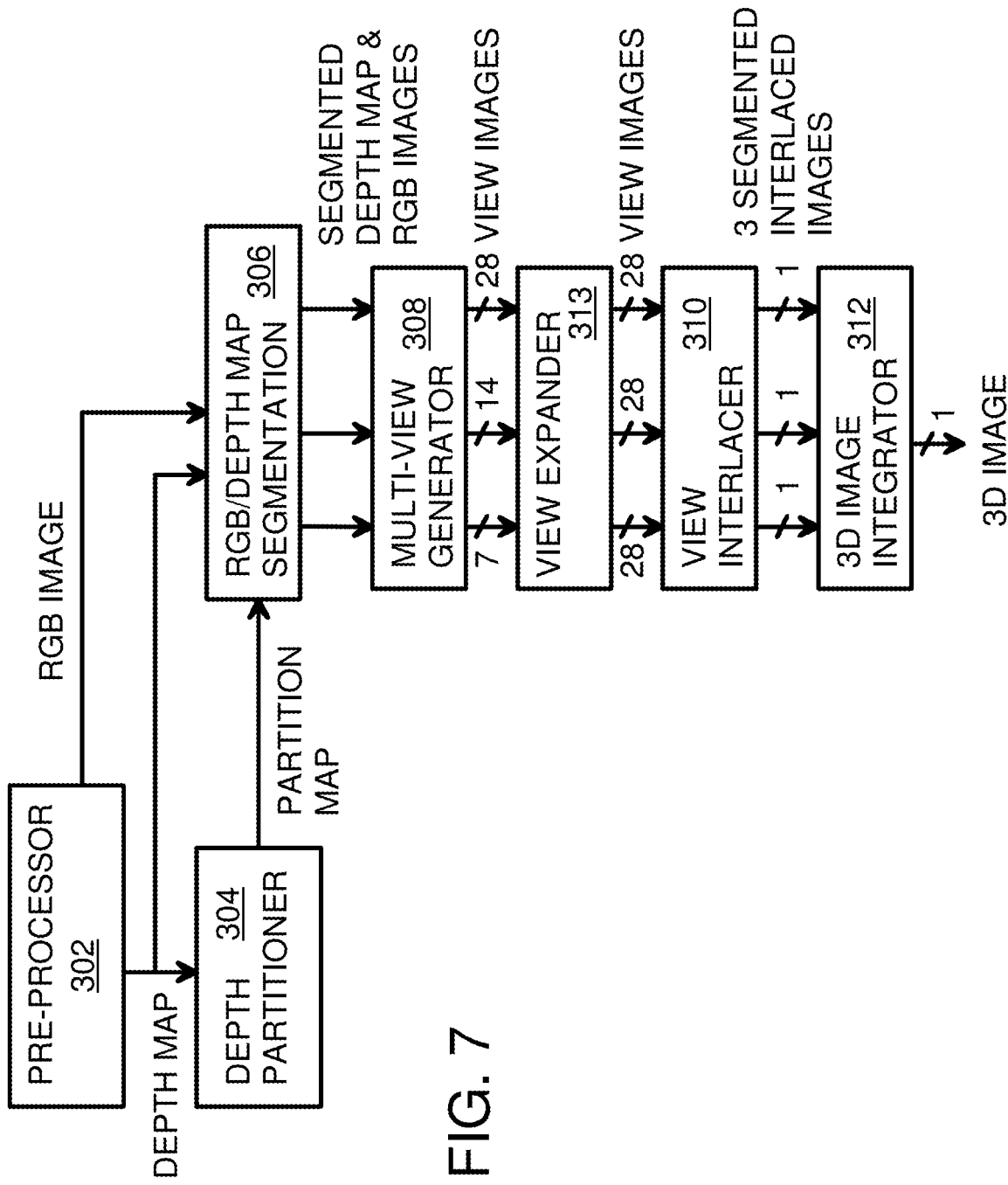
FIG. 7 is a diagram of a depth-segmented multi-view image generator for a multi-view autostereoscopic display.

FIG. 7 is a diagram of a depth-segmented multi-view image generator for a multi-view autostereoscopic display. Pre-processor 302 generates a color image and a depth map or disparity map from input data. The input data can be in a variety of formats, such as color images or color videos, with depth or disparity information. The input data may contain multiple view images, with or without depth/disparity maps. The input data may also be raw image or video from a light field camera or from multiple view cameras. Pre-processor 302 may also generate multiple color images rather than just a single color image. The depth of objects could be determined geometrically from two or more stereoscopic images, or estimated from a single image using color, edge, focus, or blur clues.

Depth partitioner 304 compares the depth values in the depth map from pre-processor 302 to one, two, or more thresholds. Depth values above the first threshold are assigned to the first partition, the closest region to the viewer. Depth values below the first threshold but above the second threshold are placed in the second partition, the middle depth partition. Finally, depth values below the second threshold are placed in the third partition, the distant-depth partition. Depth partitioner 304 can replace the depth values in the depth map with a partition number, such as 1, 2, 3 for the first, second, and distant partitions, to generate the partition map.

The partition map generated by depth partitioner 304 is used by segmenter 306 to divide each color Red-Green-Blue (RGB) image into three partitions. Each segmented RGB image has RGB data for pixels in just one partition. The RGB data for the other two partitions is set to a default value, such as black. Thus each RGB image is used to create three segmented RGB images that correspond to the three partitions.

The depth map is also segmented by segmenter 306 to create three segmented depth maps. Each segmented depth map has the depth values for only one of the partitions. The depth values for the other two partitions can be set to a null or default value.

Multi-view generator 308 receives the segmented RGB images and the segmented depth maps from segmenter 306. Multi-view generator 308 generates a different number of view images for the different partitions. The maximum number of view images, 28, is generated from the first segmented RGB image and the first segmented depth map, which have RGB or depth values only for pixels in the first partition. Multi-view generator 308 only generates 14 view images rather than the full 28 view images for the second partition, using the second segmented RGB image and the second segmented depth map.

The fewest view images are generated for the most-distant partition. Multi-view generator 308 generates only 7 view images from the third segmented RGB image and the third segmented depth map.

Rather than send 28 separate view images to the autostereoscopic display, the 28 view images are interlaced together for simultaneous display, but at different physical locations on the display. Since the view images are displayed on different physical locations on the autostereoscopic display, and the lenticular lenses direct the light from different physical location on the display at different angles toward the viewers, the different view images are visible to different viewers depending on their angles to the display. The separation amongst projections of adjacent view images by the lenticular lens array can be small enough so that each of a person's eyes sees a different view image, providing a stereoscopic or 3D effect.

View expander 313 generates 28 view images for each segment. Since there are only 7 view images in the third segmented RGB image, RGB pixels from these 7 view images are replicated or interpolated to generate 28 view images of RGB data for the third partition. Likewise, the 14 view images of the second segmented RGB image are replicated or interpolated to create 28 view images of RGB data for the second partition.

Once the full 28 view images are generated for each segment, then view interlacer 310 interleaves or interlaces pixels or sub-pixels from the 28 view images to generate one segmented interlaced image per segment. Interlacing arranges the pixels from the different view images to physical locations on the display image that are visible to the different viewer eyes. The arrangement, size, and pitch of the lenticular lenses, or other physical characteristics of the autostereoscopic display determine the locations for the interlaced pixels from the different view images. Different autostereoscopic displays may have different interlacing requirements.

View integrator 312 combines the pixels from the three segmented interlaced images for the three regions to generate one full-screen un-segmented 3D image. Pixels from the 28 view images are interlaced together to form one image that contains all 28 view images that will be displayed on 28 sets of different physical locations on the autostereoscopic display.

View integrator 312 outputs one 3D image to the autostereoscopic display for each input RGB image from pre-processor 302. The RGB image may be just one frame in a sequence of frames in a video stream being converted to multi-view by the depth-segmented multi-view image generator for an autostereoscopic display.

Computing resources are reduced since only 7 view images, not the full 28 view images, are generated for the background region of the image, while only 14 view images, not the full 28 view images, are generated for the second partition.

FIGS. 8A-8C show generation of a partition map from a depth map. Depth partitioner 304 receives the RGB image and the depth map and generates the partition map. In FIG. 8A, the RGB image shows a lawn in the foreground between buildings on the sides that extends back from the foreground into the distance. An egg-shaped building is in the center of the image past the lawn area. The sky is visible in the background above the egg-shaped building.

Pre-processor 302 can generate the depth map from stereoscopic views of the RGB image. In FIG. 8B, the depth map of the RGB image of FIG. 8A has bright regions for the lawn and side buildings in the foreground, that become darker as the buildings receded into the background. The egg-shaped building in the center of the RGB image is darker than the foreground lawn, but not as dark as the background sky.

Depth partitioner 304 uses the depth map (FIG. 8B) to generate the partition map in FIG. 8C. The polarity of the depth map and the partition map are reversed in this embodiment, so that the foreground lawn is bright in the depth map of FIG. 8B, but dark in the partition map of FIG. 8C. The background sky is dark in the depth map, but white in the partition map.

The partition map has only 3 discrete values, while the depth map has a range of depth values, such as 0 to 255. Depth values that are brighter than the first threshold as assigned to first partition 330 in the partition map. Depth values that are darker than the second threshold are assigned to third partition 334, the distant-depth partition. Depth values from the depth map that are between the first threshold and the second threshed are assigned to second partition 332. Second partition 332 includes middle-depth objects such as the front of the egg-shaped building in the center of the image, and the middle-depth surfaces of the side buildings, as well as the rear of the lawn.

FIG. 9 shows the partition map being used to segment the RGB image. The foreground lawn and front of the left-side building are selected by segmenter 306 from the RGB image using first partition 330 of the partition map. Segmenter 306 places the RGB pixels from the RGB image having locations that correspond to first partition 330 into first segmented RGB image 340. Pixel locations outside of the area defined by first partition 330 are set to a default value (black).

The middle-depths of the side buildings, the rear of the central lawn, and the front of the egg-shaped building are selected by segmenter 306 from the RGB image using second partition 332 of the partition map. Segmenter 306 places the RGB pixels from the RGB image having locations that correspond to second partition 332 into second segmented RGB image 342. Pixel locations outside of the area defined by second partition 332 are set to a default value (black) in second segmented RGB image 342.

The background sky, the rear of the egg-shaped building, and other buildings in the background are selected by segmenter 306 using third partition 334. RGB pixels from the RGB image having locations that correspond to third partition 334 are placed into third segmented RGB image 344. Pixel locations outside of the area defined by third partition 334 are set to a default value (black) in third segmented RGB image 344.

FIG. 10 shows the partition map being used to segment the depth map. In addition to segmenting the RGB image, segmenter 306 also segments the depth map.

Depth-value locations that correspond to first partition 330 of the partition map are selected by segmenter 306 and placed into first segmented depth map 350. Locations outside of the area defined by first partition 330 are set to a default depth value (black). The front lawn and the foreground of the left-side building are the only non-back areas of first segmented depth map 350.

Depth-value locations that correspond to second partition 332 of the partition map are selected by segmenter 306 and placed into second segmented depth map 352, with locations outside of the area defined by second partition 332 set to the default depth value (black). The non-black depth values in second segmented depth map 352 are for the intermediate depth objects such as the egg-shaped building, the rear lawn, and the middle-depth areas of the side buildings.

Depth-value locations that correspond to third partition 334 of the partition map are selected by segmenter 306 and placed into third segmented depth map 354, with locations outside of the area defined by third partition 334 set to the default depth value (black). The non-black depth values in third segmented depth map 354 are for the most-distant objects such as the rear of the egg-shaped building, the sky, and the rear buildings.

Since first segmented depth map 350 contains depth values of foreground objects, while third segmented depth map 354 contains depth values of background objects, first segmented depth map 350 has brighter depth values than does third segmented depth map 354. The brightness of the depth values in second segmented depth map 352 is intermediate.

Figure 11:
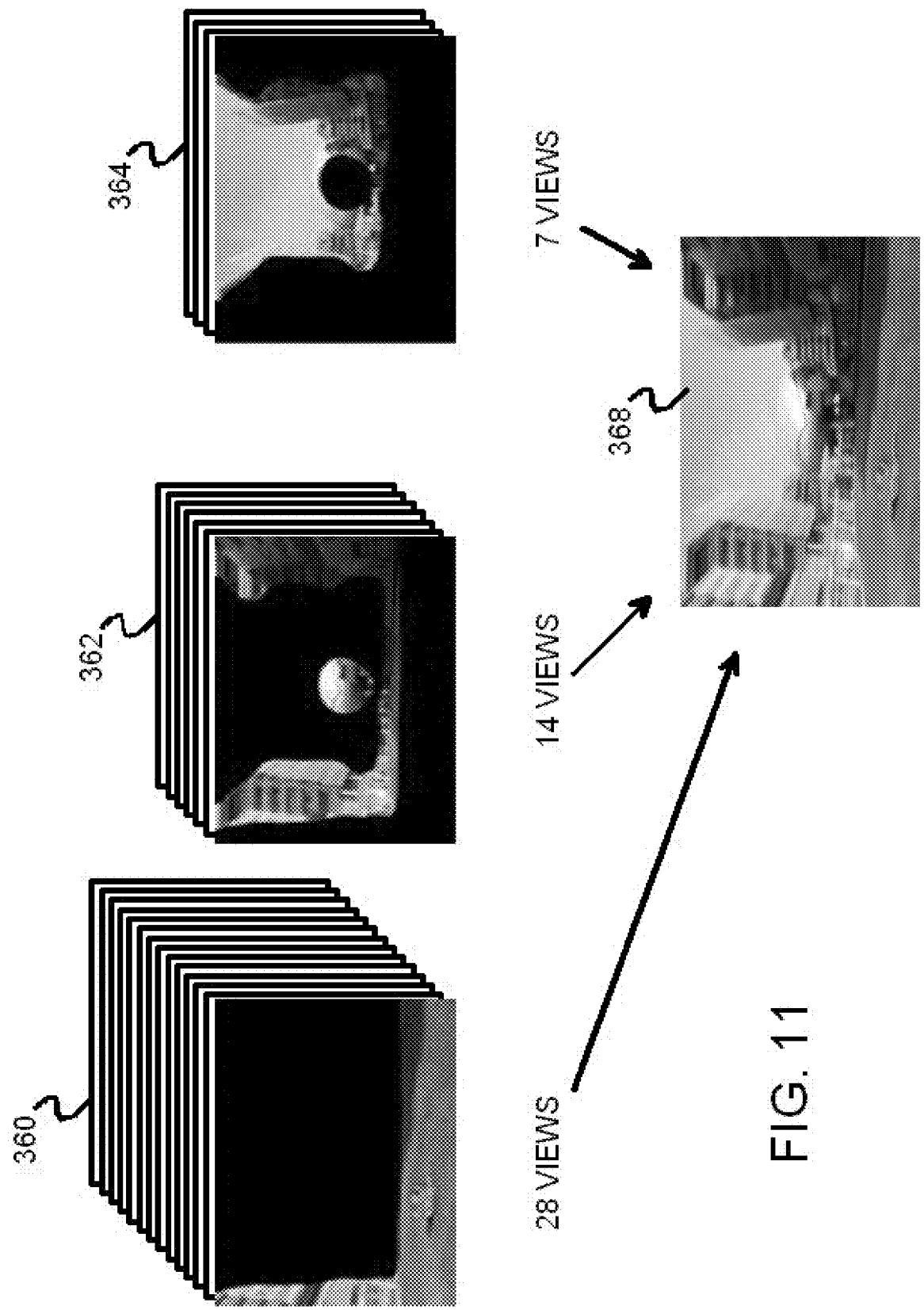
FIG. 11 shows interlacing multiple views of segmented RGB images to generate a 3D multi-view image.

FIG. 11 shows interlacing multiple views of segmented RGB images to generate a 3D multi-view image. Multi-view generator 308 uses depth values from first segmented depth map 350 and pixels from first segmented RGB image 340 to generate 28 first-segment views 360 of the foreground objects.

Multi-view generator 308 also uses depth values from second segmented depth map 352 and pixels from second segmented RGB image 342 to generate 14 second-segment view images 362 of the middle-depth objects. Multi-view generator 308 uses depth values from third segmented depth map 354 and pixels from third segmented RGB image 344 to generate 7 third-segment view images 364 of the background objects. Pixels are shifted by a shift amount or parallax that is a function of the different viewpoints in the different view images.

According to zero-parallax plane (ZPS) and viewpoint information, the depth map can be used to generate a disparity map or a parallax map using geometric triangulation. A new view image can be generated from the parallax map and the input RGB image. The disparity map could also be used to generate multiple parallax maps. A parallax map contains parallax values for pixel shifts between one view image and the input RGB image, while a disparity map contains disparity values of pixel shifts between two stereo images.

View expander 313 replicates the 7 third-segment view images 364 to generate a total of 28 third-segment view images, although only 7 of the 28 view images are unique. Interpolation between pixels in two of the view images rather than replication could also be used to expand the 7 view images to 28.

Likewise, view expander 313 duplicates the 14 second-segment view images 362 to generate a total of 28 second-segment view images, with only half of the view images being unique or original.

Pixels are from the 28 view images for the segment are interlaced by view interlacer 310 to generate a single interlaced image for each segment. Then view integrator 312 integrates RGB pixel data from the 3 segmented interlaced images for the 3 segments to generate integrated 3D full-frame image 368.

View integrator 312 selects RGB pixels from the single interlaced image that was generated from the 28 first-segment view images 360 for locations in first partition 330. View integrator 312 selects RGB pixels from the single interlaced image that was generated from the 14 second-segment view images 362 for locations in second partition 332, and View integrator 312 selects RGB pixels from the single interlaced image that was generated from the 7 third-segment view images 364 for locations in third partition 334.

Figure 12:
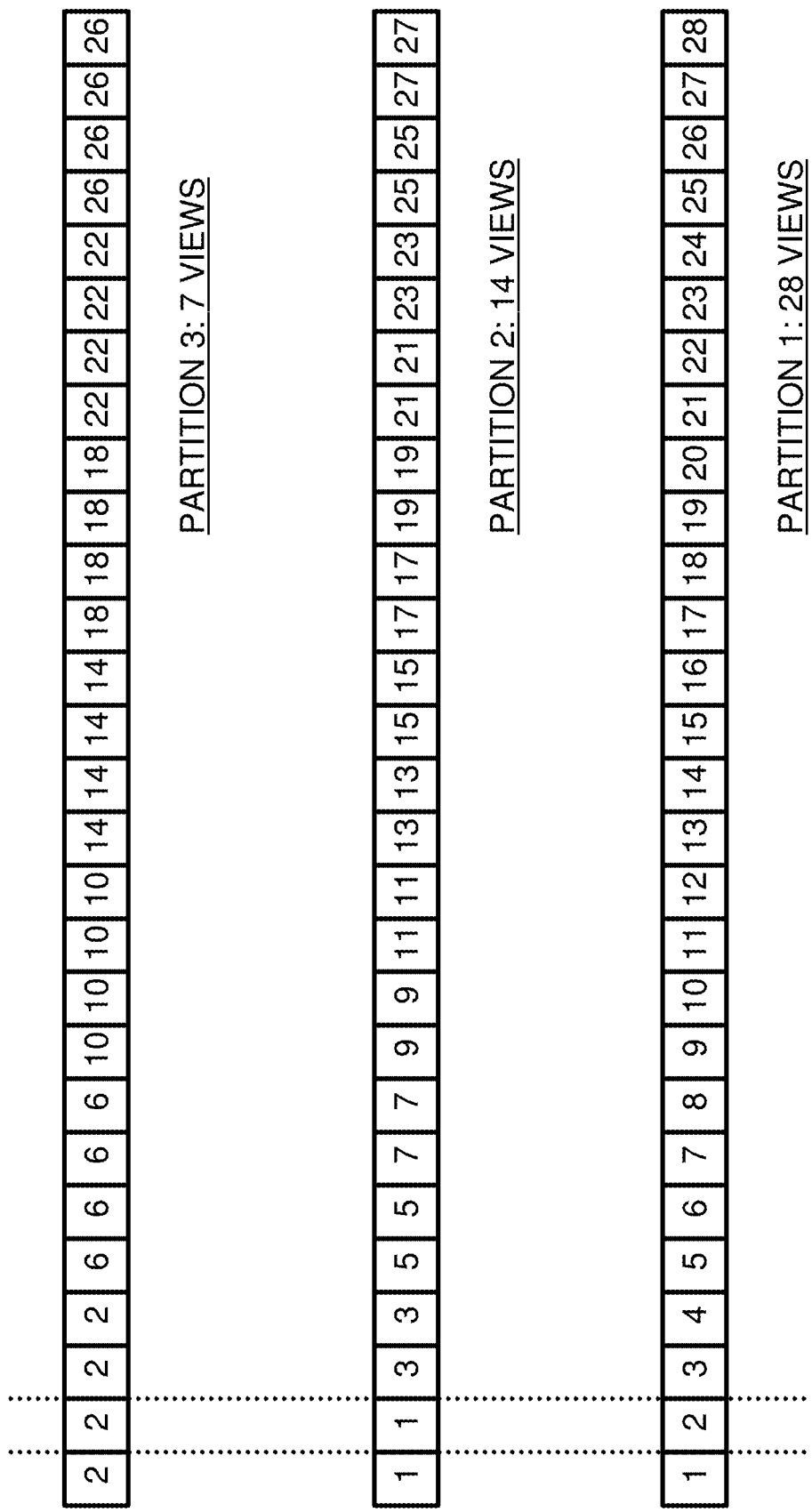
FIG. 12 illustrates replicating view images to reduce computational resources.

FIG. 12 illustrates replicating view images to reduce computational resources. Multi-view generator 308 generates only 7 view images for the third segment. These 7 view images that are labeled 2, 6, 10, 14, 18, 22, 26 in the top of FIG. 12. Each of these 7 views are replicated three times to expand to the full 28 view images by view expander 313.

Multi-view generator 308 generates only 14 view images for the second segment. These 14 view images are assigned odd view numbers and labeled 1, 3, 5, 7, 9, 11, 13, 15, 17, 19, 21, 23, 25, 27 in the middle strip of FIG. 12. Each of these 14 views each replicated once by view expander 313 to expand to the full 28 view images.

Multi-view generator 308 generates all 28 view images for the first segment. These 28 view images that are labeled 1-28 in the bottom strip of FIG. 12.

Starting from the left column of all three strips in FIG. 12, during interlacing view interlacer 310 interlaces pixels from view 2 of the third segment, view 1 of the second segment, and view 1 of the first segment when generating pixels for the physical locations of view 1 on the autostereoscopic display. Similarly, view interlacer 310 interlaces pixels from view 2 of the third segment, view 1 of the second segment, and view 2 of the first segment when generating pixels for the physical locations of view 2 on the autostereoscopic display. View interlacer 310 interlaces pixels from view 2 of the third segment, view 3 of the second segment, and view 3 of the first segment when generating pixels for the physical locations of view 3 on the autostereoscopic display. View interlacer 310 interlaces pixels from view 2 of the third segment, view 3 of the second segment, and view 4 of the first segment when generating pixels for the physical locations of view 4 on the autostereoscopic display.

From the last column, view interlacer 310 interlaces pixels from view 26 of the third segment, view 27 of the second segment, and view 28 of the first segment when selecting pixels for the physical locations of view 28 on the autostereoscopic display.

Figure 13B:
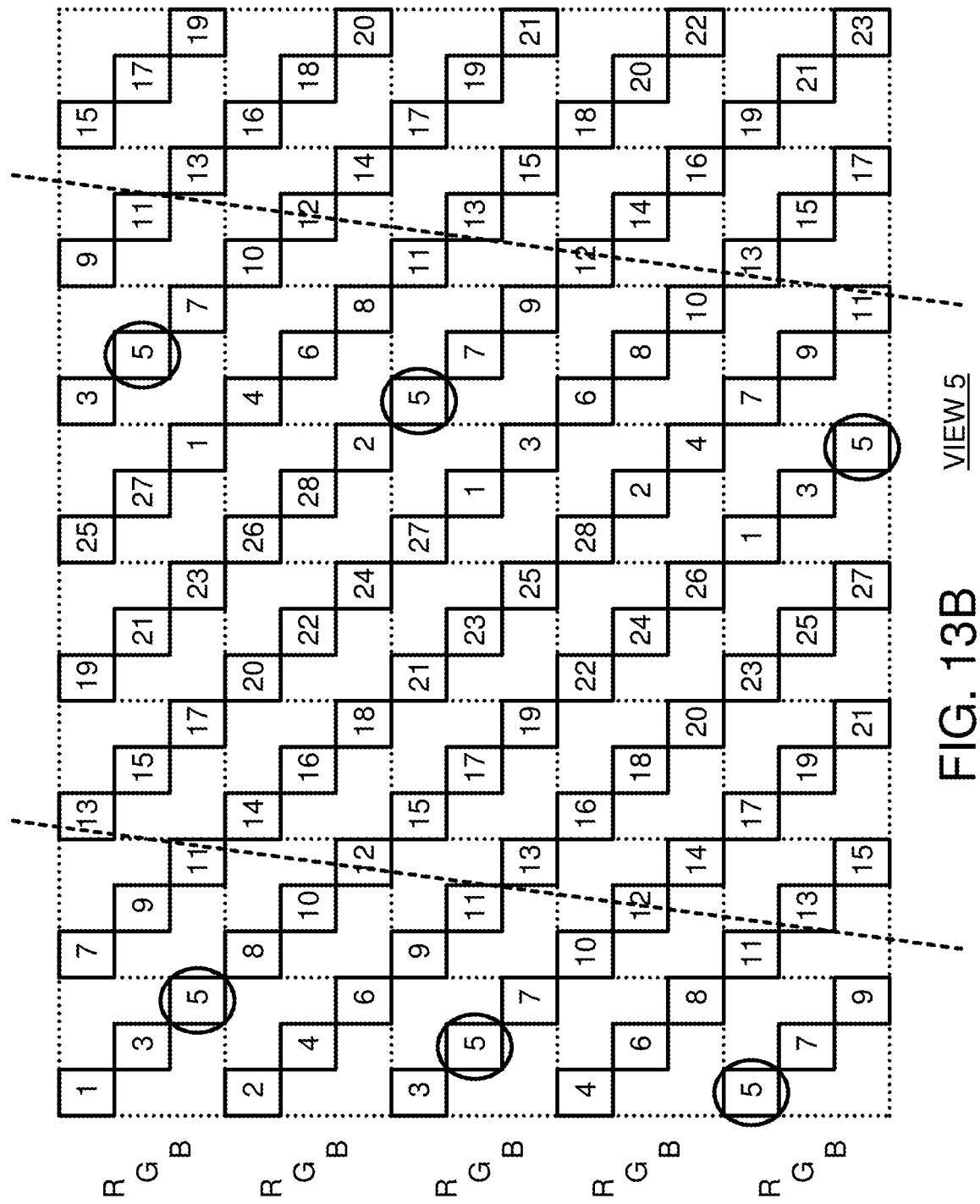

FIGS. 13A-13B illustrate sub-pixel interlacing. Each RGB pixel has a Red, Green, and Blue sub-pixel. The R,G, and B sub-pixels can come from different view images when sub-pixel interlacing is used and supported by the autostereoscopic display. In FIGS. 13A-13B, the RGB subpixels are shown stacked in a diagonal arrangement for easier understanding of the drawings, but in reality the R,G, and B sub-pixels from the same pixel likely are arranged in a row on the physical autostereoscopic display. Thus the first display row has a repeating row of sub-pixels interlaced from view images 1,3,5, 7,9,11, 13,15,17, 19,21,23, 25,27,1, 3,5,7, etc. The second row has a second repeating row of sub-pixels 2,4,6, 8,10,12, 14,16,18, 20,22,24, 26,28,2, 4,6,8, etc.

The upper left pixel in FIG. 13A has a red sub-pixel from view image #1, and is visible only to a viewer's eye at viewpoint #1, and is not visible to viewer eyes in viewpoints 2-28. This upper left pixel also has a Green sub-pixel from view image #3, and is visible only to a viewer's eye at viewpoint #3, and is not visible to viewer eyes in viewpoints 1-2 and 4-28. This upper left pixel has a Blue sub-pixel from view image #5, and is visible only to a viewer's eye at viewpoint #5, and is not visible to viewer eyes in viewpoints 1-4 and 6-28.

The right-most pixel in the first row of FIG. 13A has 15, 17, 19 for its R, G, and B sub-pixels. The red sub pixel is from view image #15 is only visible to a viewer's eye at viewpoint 15, and is not visible at viewpoints 1-14 and 16-28. The blue sub pixel is from view image #19 is only visible to a viewer's eye at viewpoint 19, and is not visible at viewpoints 1-18 and 20-28. An actual display would have the rows and columns continue with this interlacing pattern.

In FIG. 13B the sub-pixels for view #5 are circled. View image 5 supplies the blue sub-pixel for the first-row pixel in the first column, the green sub-pixel for the third-row pixel in the first column, and the red sub-pixel for the fifth-row pixel in the first column.

View image 5 also supplies the blue sub-pixel for the fifth-row pixel in the fifth column, the green sub-pixel for the first-row pixel in the sixth column, and the red sub-pixel for the third-row pixel in the sixth column.

Rather than have the pixels from one view image to always reside in the same vertical column, in this interlacing pattern, the view image's pixels are successively placed in prior columns. The pixels from one view image are placed in a slanted or tilted pattern. The array of lenticular lenses on the autostereoscopic display can also be tiled to match the interlacing pattern. In this example, the slant angle is ⅙, since one full pixel (R,B, and C sub-pixels) occur for every 6 rows (3 odd, 3 even rows). The dashed lines show the approximate slant to the lenticular lenses. The slant is somewhat distorted in the drawings due to showing the R,G,B sub-pixels on a diagonal rather than lined up in a row.

Since the first row has only odd views, the pattern repeats after 28/2 or 14 full pixels. The columns use all 28 views, for three sub-pixels, so repeats after 28×3 or 84 rows. The slant angle is thus 14/84 or ⅙ columns/row.

If whole pixels were interlaced, there could be 14 columns in the repeating pattern for 28 views with odd/even rows. However, when sub-pixels are interlaced, there need be only 9 or 10 columns (28/3) in the repeating pattern. Thus sub-pixel interlacing allows for more views. Many other interlacing patterns and variations are possible.

Figure 14:
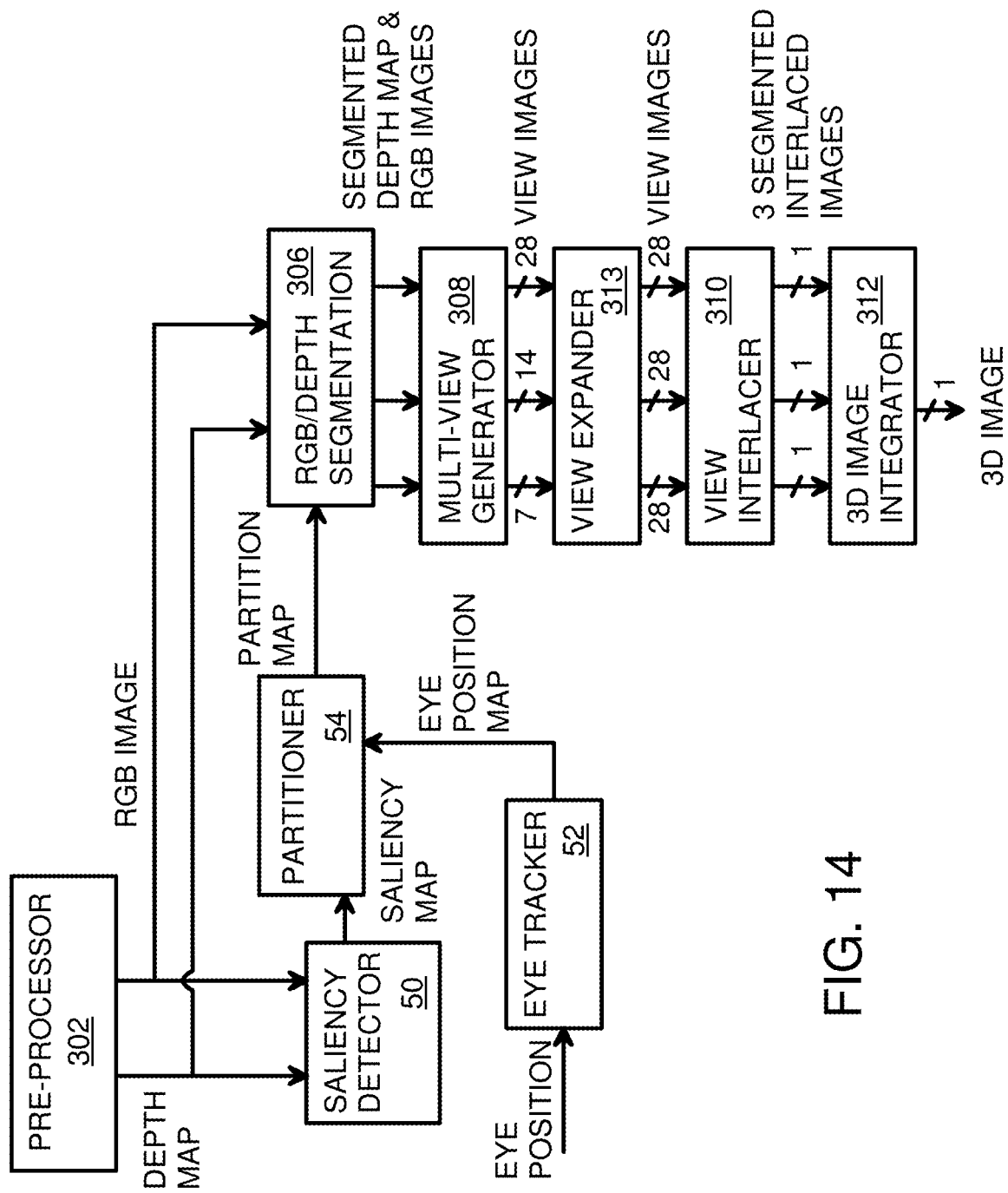
FIG. 14 is a diagram of a saliency-segmented multi-view image generator for a multi-view autostereoscopic display.

FIG. 14 is a diagram of a saliency-segmented multi-view image generator for a multi-view autostereoscopic display. Pre-processor 302 generates a depth map from image data. For example, the depth of objects could be determined from two stereoscopic images using geometric triangulation.

Saliency detector 50 analyzes the RGB image and depth map to generate a saliency map. Saliency can be determined using various algorithms and techniques. Visual saliency is the distinct perceptual quality that makes certain regions of a scene stand out relative to its neighbors and thus capture the viewer's attention. Saliency estimation methods can broadly be classified as biologically based, purely computational, or combinations. Some methods employ a low-level approach of determining contrast of image regions relative to their surroundings using one or more features of intensity, color, and orientation, assuming that human attention is sensitive to high-contrast regions. If a region is distinctive in intensity, color, texture, or motion, it is considered a high salient region. Foreground objects or objects with higher luminosity or brighter colors can be assigned a higher saliency value than gray objects and background objects. Objects closer to the center of the frame can be assigned higher saliency than peripheral objects.

Eye tracker 52 can be used to determine the viewer's eye position or movements, and the eye position used to determine where the user's gaze is focused on. An eye position image or map may be generated by eye tracker 52. Partitioner 54 can use the eye position map generated by eye tracker 52 to increase the saliency values for objects having locations that the viewer's gaze is focused on, or objects in areas that the user has been focused on more recently or for a longer period of time.

Partitioner 54 compares the saliency values in the saliency map from saliency detector 50 to one, two, or more thresholds. Saliency values above the first threshold are assigned to the first partition, the most salient to the viewer. Saliency values below the first threshold but above the second threshold are placed in the second partition, the middle saliency partition. Finally, saliency values below the second threshold are placed in the third partition, the least-salient partition. Partitioner 54 can replace the saliency values in the saliency map with a partition number, such as 1, 2, 3 for the first, second, and distant partitions, to generate the partition map.

The partition map generated by partitioner 54 is used by segmenter 306 to divide each RGB image into three partitions. Each segmented RGB image has RGB data for pixels in just one partition. The RGB data for the other two partitions is set to a default value, such as black. Thus each RGB image is used to create three segmented RGB images that correspond to the three partitions.

The depth map is also segmented by segmenter 306 to create three segmented depth maps. Each segmented depth map has the depth values for only one of the partitions. The depth values for the other two partitions can be set to a null or default value.

Multi-view generator 308 receives the segmented RGB images and the segmented depth maps from segmenter 306. Multi-view generator 308 generates a different number of view images for the different partitions. The maximum number of view images, 28, is generated from the first segmented RGB image and the first segmented depth map, which have RGB or depth values only for pixels in the first partition. Multi-view generator 308 only generates 14 view images rather than the full 28 view images for the second partition, using the second segmented RGB image and the second segmented depth map.

The fewest view images are generated for the most non-salient partition. Multi-view generator 308 generates only 7 view images from the third segmented RGB image and the third segmented depth map.

Rather than send 28 separate view images to the autostereoscopic display, the 28 view images are interlaced together for simultaneous display, but at different physical locations on the display. Since the view images are displayed on different physical locations on the autostereoscopic display, and the lenticular lenses direct the light from different physical location on the display at different angles toward the viewer's eyes, the different view images are visible to different viewers depending on their angles to the display.

View expander 313 generates 28 view images for each segment. Since there are only 7 view images in the third segmented RGB image, RGB pixels from these 7 view images are replicated or interpolated to generate 28 view images of RGB data for the third partition. Likewise, the 14 view images of the second segmented RGB image are mapped or interpolated to create 28 view images of RGB data for the second partition.

Once the full 28 view images are generated for each segment, then view interlacer 310 interleaves or interlaces pixels or sub-pixels from the 28 segmented view images to generate one segmented interlaced image per segment. Interlacing arranges the pixels from the different view images to physical locations on the display image that are visible to the different viewer eyes. The arrangement, size, and pitch of the lenticular lenses, or other physical characteristics of the autostereoscopic display determine the locations for the interlaced pixels from the different view images. Different autostereoscopic displays may have different interlacing requirements.

View integrator 312 combines the pixels from the three segmented interlaced images for the three regions to generate one full un-segmented image. Pixels from the 28 view images are interlaced together to form one image that contains all 28 view images that will be displayed on 28 sets of different physical locations on the autostereoscopic display.

View integrator 312 outputs one 3D image to the autostereoscopic display for each input RGB image from pre-processor 302. The RGB image may be just one frame in a sequence of frames in a video stream being converted to multi-view by the depth-segmented multi-view image generator that generates images for display on an autostereoscopic display.

Computing resources are reduced since only 7 view images, not the full 28 view images, are generated for the background region of the image, while only 14 view images, not the full 28 view images, are generated for the second partition.

Figure 15:
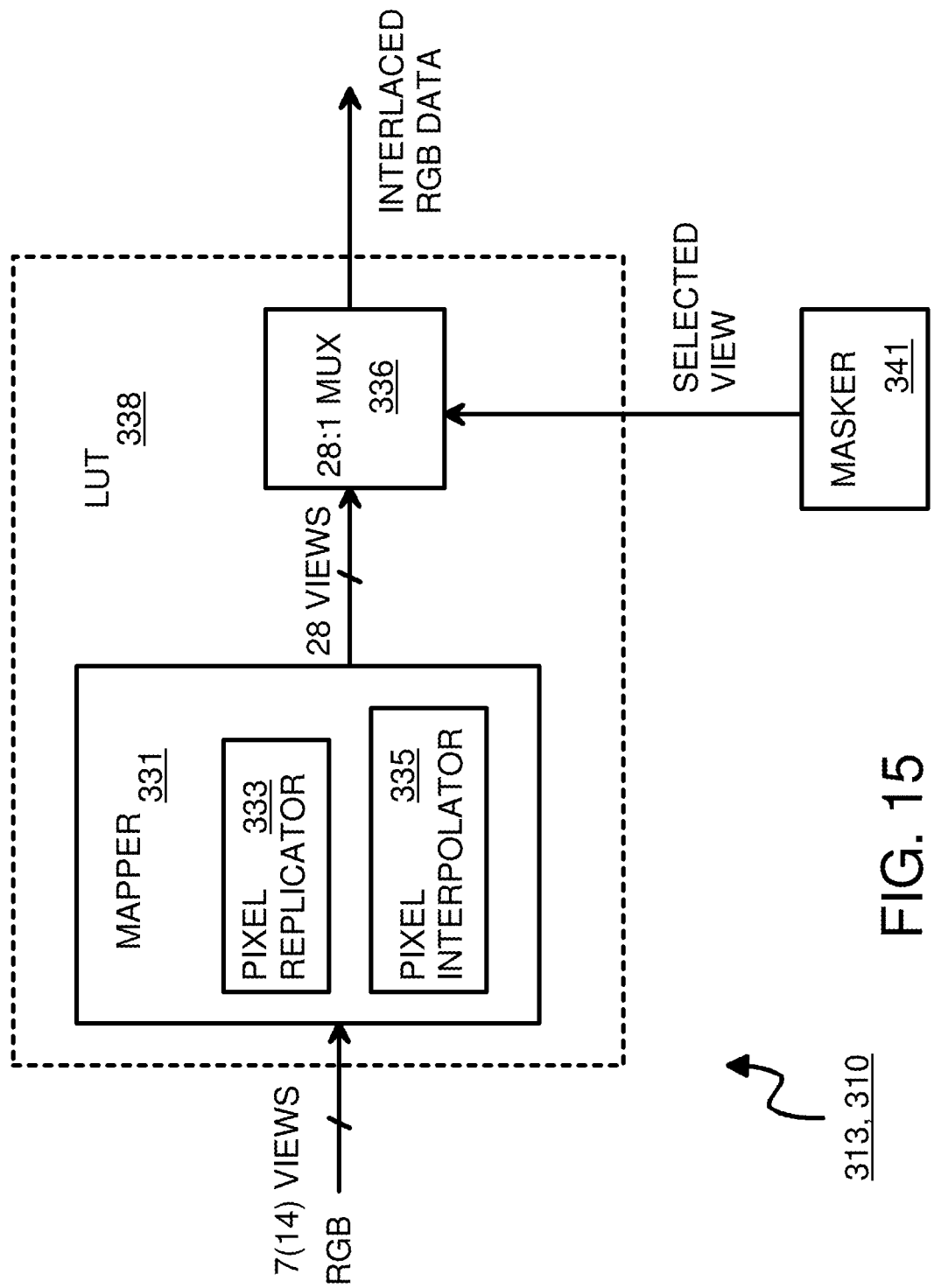
FIG. 15 shows a view interlacer in more detail.

FIG. 15 shows a view interlacer in more detail. View expander 313 and interlacer 310 can be implemented by Look-Up Table (LUT) 338 and masker 341 which selects which one of the 28 views that mux 336 selects pixels or sub-pixels from when constructing the interlaced 3D image for the current segment. Mapper 331 passes through the 28 view images for the first segment view images to mux 336. For the second segment, mapper 331 duplicates the 14 view images using pixel replicator 333 to generate a total of 28 view images, although only 14 of the 28 view images are unique. Mapper 331 replicates the 7 view images for the third segment of view images to generate a total of 28 view images. Each view image from multi-view generator 308 is replicated to generate 4 view images. Masker 341 outputs a selector value that selects a sub-pixel from one of the 28 views for placement in an x,y location in the interlaced 3D image for the current segment.

Rather than use pixel replicator 333 to generate identical view images, pixel interpolator 335 can be used to generate interpolated view images. Then the 7 view images for the third segment are used to generate 21 interpolated view images. Likewise, the second segment has 14 unique view images and 14 interpolated view images output by mapper 331 when pixel interpolator 335 is used.

The operations performed by pixel replicator 333 or pixel interpolator 335 in mapper 331, and by mux 336 can be operated upon a full set of all possible input pixel values to generate pre-computed results to store in LUT 338. LUT 338 can perform mapping and interlacing for each sub-pixel. LUT 338 could contain result values that indicate which surrounding pixel to interpolate from, or which pixels to replicate, or the final sub-pixel values. LUT 338 may also perform the functions of view expander 313.

Figure 16A:
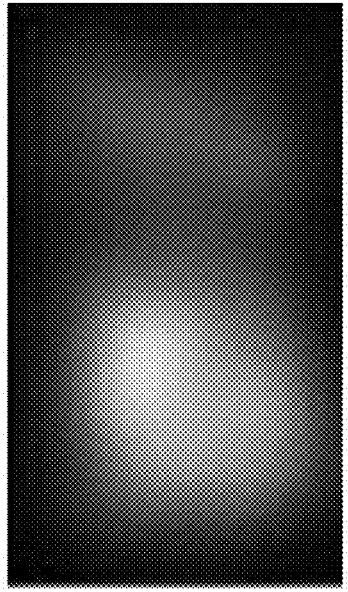
FIGS. 16A-16C show generation of a partition map from a saliency map.
Figure 16B:
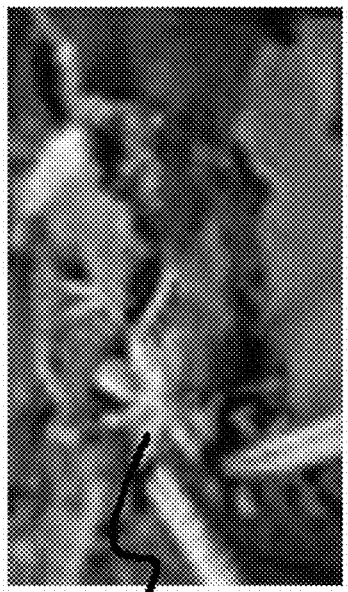
Figure 16C:
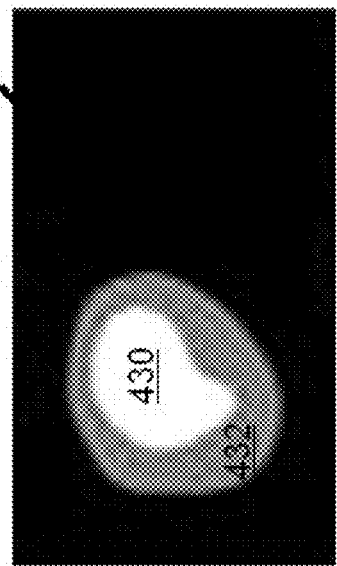

FIGS. 16A-16C show generation of a partition map from a saliency map. Saliency detector 50 (FIG. 14) receives the RGB image and the depth map and generates a saliency map. Partitioner 54 then uses the saliency map to generate the partition map.

In FIG. 16A, the RGB image shows a brightly-colored flower in the center that is surrounded by green leaves. In FIG. 16B, the saliency map has a high-saliency region centered on the flower, as shown by the bright areas that correspond to high saliency values. Saliency detector 50 could detect the bright color of the flower against the green background to assign higher saliency values to the flower. The flower is not necessarily the closest object (See FIG. 18 the brighter leaves in 454 than the flower in 450), since some of the green leaves are closest to the view. Thus using the saliency map is superior to using only the depth map to determine the partitions.

In FIG. 16C, the partition map has only 3 discrete values, while the saliency map has a range of saliency values, such as 0 to 255. Saliency values that are brighter than the first threshold as assigned to first partition 430 in the partition map. Saliency values that are darker than the second threshold are assigned to third partition 434, the least-salient partition. Saliency values from the saliency map that are between the first threshold and the second threshed are assigned to second partition 432. Second partition 432 includes middle-saliency objects such as the area surrounding the flower.

FIG. 17 shows the partition map being used to segment the RGB image. The flower is selected by segmenter 306 from the RGB image using first partition 430 of the partition map. Segmenter 306 places the RGB pixels from the RGB image having locations that correspond to first partition 430 into first segmented RGB image 440. Pixel locations outside of the area defined by first partition 330 are set to a default value (black).

The middle-saliency area surrounding the flower is selected by segmenter 306 from the RGB image using second partition 432 of the partition map. Segmenter 306 places the RGB pixels from the RGB image having locations that correspond to second partition 432 into second segmented RGB image 442. Pixel locations outside of the area defined by second partition 432 are set to a default value (black) in second segmented RGB image 442.

The background leaves and foliage are selected by segmenter 306 using third partition 434. RGB pixels from the RGB image having locations that correspond to third partition 434 are placed into third segmented RGB image 444. Pixel locations outside of the area defined by third partition 434 are set to a default value (black) in third segmented RGB image 344.

FIG. 18 shows the partition map being used to segment the depth map. In addition to segmenting the RGB image, segmenter 306 also segments the depth map.

Depth-value locations that correspond to first partition 430 of the partition map are selected by segmenter 306 and placed into first segmented depth map 450. Locations outside of the area defined by first partition 430 are set to a default depth value (black). The flower is the only non-back areas of first segmented depth map 450.

Depth-value locations that correspond to second partition 432 of the partition map are selected by segmenter 306 and placed into second segmented depth map 452, with locations outside of the area defined by second partition 432 set to the default depth value (black). The non-black depth values in second segmented depth map 452 are for the intermediate saliency objects such as the foliage surrounding the flower.

Depth-value locations that correspond to third partition 434 of the partition map are selected by segmenter 306 and placed into third segmented depth map 454, with locations outside of the area defined by third partition 434 set to the default depth value (black). The non-black depth values in third segmented depth map 454 are for the least-salient objects such as the foliage. Note that the foliage contains both near and far objects, as evident by the bright regions in the lower left of third segmented depth map 454. These bright regions in third segmented depth map 454 are brighter than the flower in first segmented depth map 450, indicating that the leaves in the lower right are closer than the flower, although the flower is detected as a more salient object by saliency detector 50.

Figure 19:
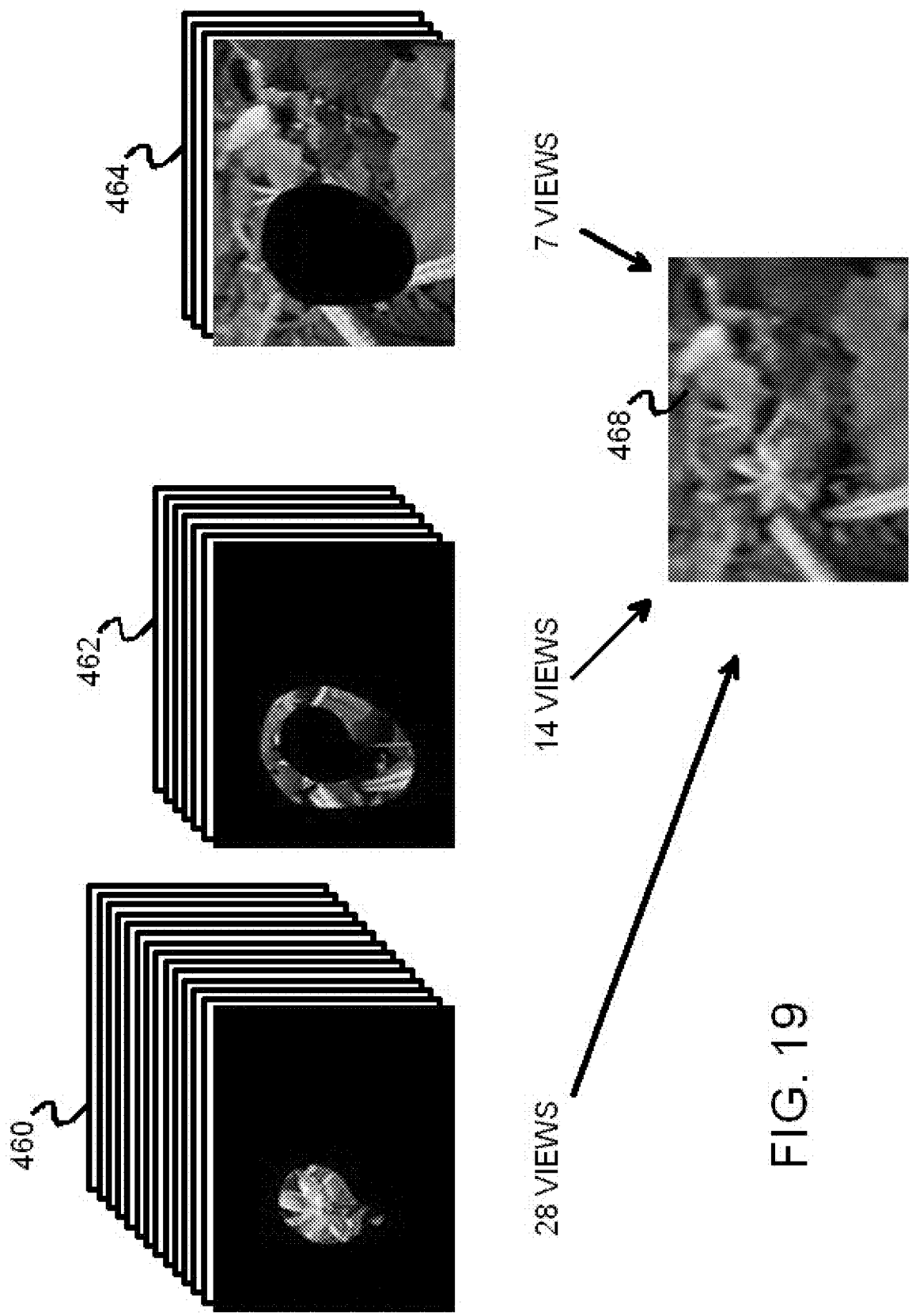
FIG. 19 shows interlacing multiple views of segmented RGB images to generate a 3D multi-view image.

FIG. 19 shows interlacing multiple views of segmented RGB images to generate a 3D multi-view image. Multi-view generator 308 uses depth values from first segmented depth map 450 and pixels from first segmented RGB image 440 to generate 28 first-segment views 460 of the most-salient objects.

Multi-view generator 308 also uses depth values from second segmented depth map 452 and pixels from second segmented RGB image 442 to generate 14 second-segment view images 462 of the middle-depth objects. Multi-view generator 308 uses depth values from third segmented depth map 454 and pixels from third segmented RGB image 444 to generate 7 third-segment view images 464 of the background objects. Pixels are shifted by a shift amount using a parallax map that is computed from the depth map or disparity map. The pixel values in the parallax map give the pixel offsets between newly generated view image and the input reference view image. In addition, it's possible to shift by subpixel rather than by full pixels.

View expander 313 replicates the 7 third-segment view images 464 to generate a total of 28 third-segment view images, although only 7 of the 28 view images are unique. Interpolation between pixels in two of the view images rather than replication could also be used to expand the 7 view images to 28.

Likewise, view expander 313 duplicates the 14 second-segment view images 462 to generate a total of 28 second-segment view images, with only half of the view images being unique or original.

Pixels are from the 28 view images for the segment are interlaced by view interlacer 310 to generate a single interlaced image for each segment. Then view integrator 312 integrates RGB pixel data from the 3 segmented interlaced images for the 3 segments to generate integrated 3D full-frame image 468.

View integrator 312 selects RGB pixels from the single interlaced image that was generated from the 28 first-segment view images 460 for locations in first partition 430. View integrator 312 selects RGB pixels from the single interlaced image that was generated from the 14 second-segment view images 462 for locations in second partition 432, and View integrator 312 selects RGB pixels from the single interlaced image that was generated from the 7 third-segment view images 464 for locations in third partition 434.

Figure 20A:
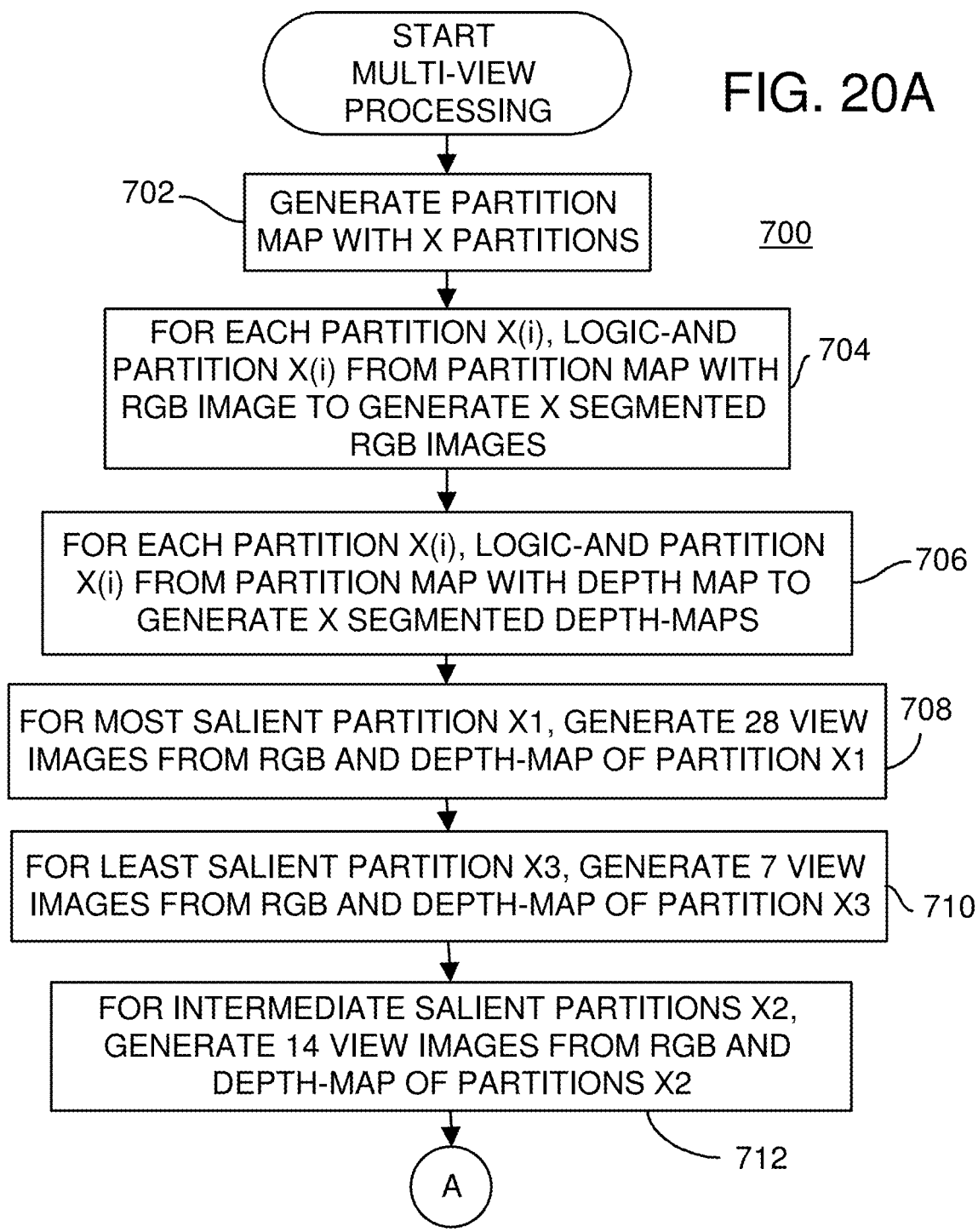

FIGS. 20A-20B show a routine for a saliency-segmented multi-view image generator for a multi-view autostereoscopic display. An RGB image in a sequence of images has a depth map. A partition map is generated from the depth map, or from a saliency map that is generated by a saliency detector. The partition map is generated by partition routine 702 to have X regions. Segmented multi-view display routine 700 can have the partition map generated from a depth map or from a saliency map.

A segmented RGB image is generated for each of the X partitions, step 704. All pixel locations in the partition map with a value of X can be set to a one, while all other locations are set to a 0 to generate a partition mask. Then the partition mask is logically AND'ed with the RGB image to generate the segmented RGB image for partition X.

A segmented depth map is also generated for each of the X partitions, step 706. The X partition masks used in step 704 are also logically AND'ed with the depth map to generate X segmented depth maps, the segmented depth maps.

For the first partition X1, which is the most-salient region, the segmented RGB image and the segmented depth map for partition X1 are used to generate 28 view images, step 708. Each of the 28 view images is for a different viewer's eye location. Using geometry, a location-shift or parallax can be added to the segmented RGB image by multi-view generator 308. Pixels from the segmented RGB image can be shifted to account for the different depths in the segmented depth map, with the shift amount read from a parallax map that is calculated according to the zero-parallax plane and viewpoint locations. Different view images will have different viewer's eye locations, different parallax maps, and thus different shift amounts or introduced parallax.

For the last partition X3, which is the least-salient region, the segmented RGB image and the segmented depth map for partition X3 are used to generate only 7 view images, step 710. Each of the 7 view images is for a different viewer's eye location. Multi-view generator 308 uses the parallax map generated using a depth map, the zero-parallax plane, and viewpoint locations to determine shift amounts to shift pixels by in the segmented RGB image for partition X3, using the depth value for the pixel being shifted from the segmented depth map for partition X3. The shifted pixels are output as the view image for the view being generated.

For the middle partition X2, which is the intermediate-salient region, the segmented RGB image and the segmented depth map for partition X2 are used to generate only 14 view images, step 712. Each of the 14 view images is for a different viewer's eye location. Multi-view generator 308 uses the parallax map generated using the depth map, the zero-parallax plane, and viewpoint locations to determine shift amounts to shift pixels by in the segmented RGB image for partition X2, using the depth value for the pixel being shifted from the segmented depth map for partition X2. The shifted pixels are output as the view image for the view being generated for partition X2, the segmented view images.

Continuing in FIG. 20B, the 7 segmented view images for partition X3 are each replicated three times to generate 28 segmented view images. Only 7 of these 28 view images are unique; the other 21 are replicas. Rather than replication, the additional 21 view images instead could be generated by interpolating between pairs of the 7 unique view images.

Once the 28 segmented view images are generated for partition X3, step 714, then sub-pixels from the 28 segmented view images are interlaced together to generate a single multi-view 3D image for region X3. Interlacing causes sub-pixels from each view image to appear only in some physical locations and not in other physical locations in the single multi-view 3D image. These physical locations are viewable by one of the 28 viewpoints but not by others of the 28 viewpoints when the interlaced multi-view 3D image is displayed on an autostereoscopic display.

In step 716, the 14 segmented view images for partition X2 are each replicated once to generate 28 segmented view images. Only 14 of these 28 view images are unique; the other 14 are replicas. Rather than replication, the additional 14 view images instead could be generated by interpolating between pairs of the 14 unique view images.

Once the 28 segmented view images are generated for partition X2, step 716, then sub-pixels from the 28 segmented view images are interlaced together to generate a single multi-view 3D image for region X2.

The 28 view images for first partition X1 are also interlaced, step 719. Sub-pixels from the 28 segmented view images are interlaced together to generate a single multi-view 3D image for region X1.

The three segmented multi-view 3D images for the three partitions X1, X2, X3 are integrated together, step 718. A full-frame multi-view 3D image is generated that can be sent to the autostereoscopic display that will display 28 view images to 28 viewer eye locations at different angles to the screen of the autostereoscopic display.

Figure 21B:
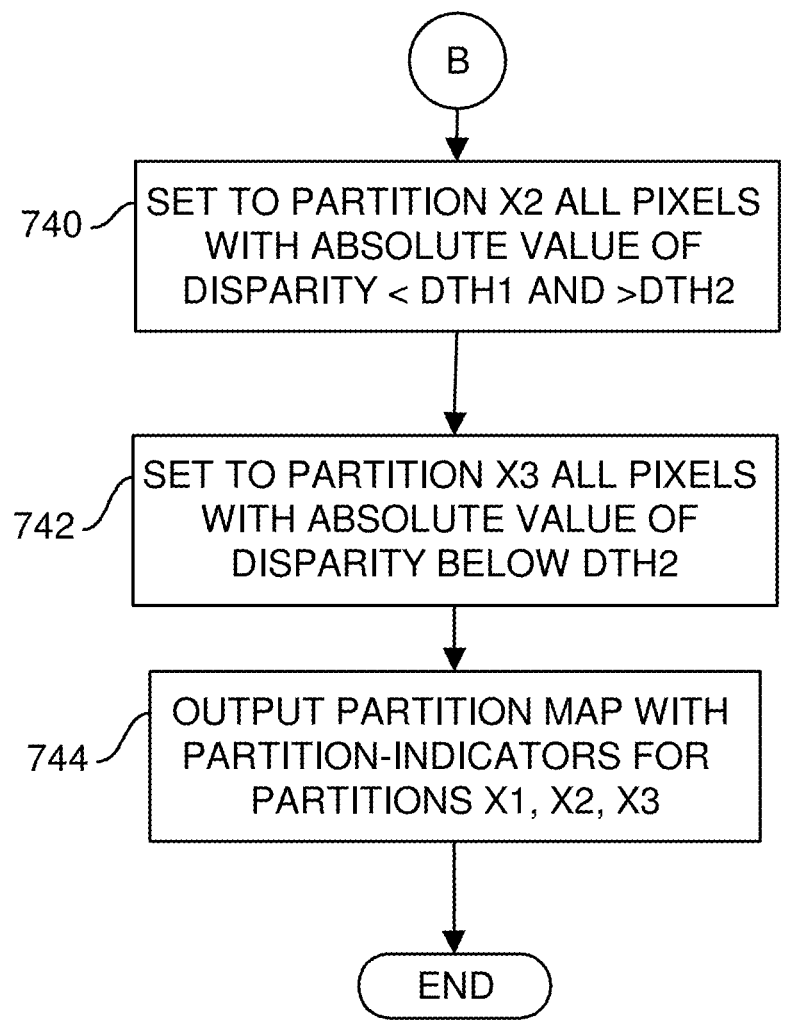

FIGS. 21A-21B show generating a partition map from a depth map using disparity values. Partition routine 702A uses disparity values rather than depth values for partitioning in this alternative. An absolute disparity map is generated from the depth map, step 730. In step 730, the depth map is converted to a disparity map, and then to an absolute disparity map. The absolute disparity is the absolute parallax or shift of an object at a depth indicated by the depth map when projected onto screen 110 (FIGS. 3-4). Thus absolute disparity depends on the location of screen 110 relative to the objects, while the depth values do not depend on the location of screen 110.

At least two disparity thresholds DTH1, DTH2 are set, step 734. All pixel locations having an absolute disparity value in the absolute disparity map that is greater than first threshold DTH1 are placed into first partition X1, step 736. The locations of these pixels in the partition map can be set to a first partition-indicator value, such as 1.

All pixel locations having an absolute disparity value in the absolute disparity map that is between first threshold DTH1 and second threshold DTH2 are placed into second partition X2, step 740. The locations of these pixels in the partition map can be set to a second partition-indicator value, such as 2.

All pixel locations having an absolute disparity value in the absolute disparity map that is less than the second threshold DTH2 are placed into third partition X3, step 742. The locations of these pixels in the partition map can be set to a third value, such as 3.

The resulting partition map that is output, step 744, has partition indicators for all pixel locations. When the partition-indicator for a pixel location is 1, that location is in the first partition. A partition-indicator value of 3 indicates the third partition X3, while a partition-indicator value of 2 indicates the second partition X2.

Figure 22B:
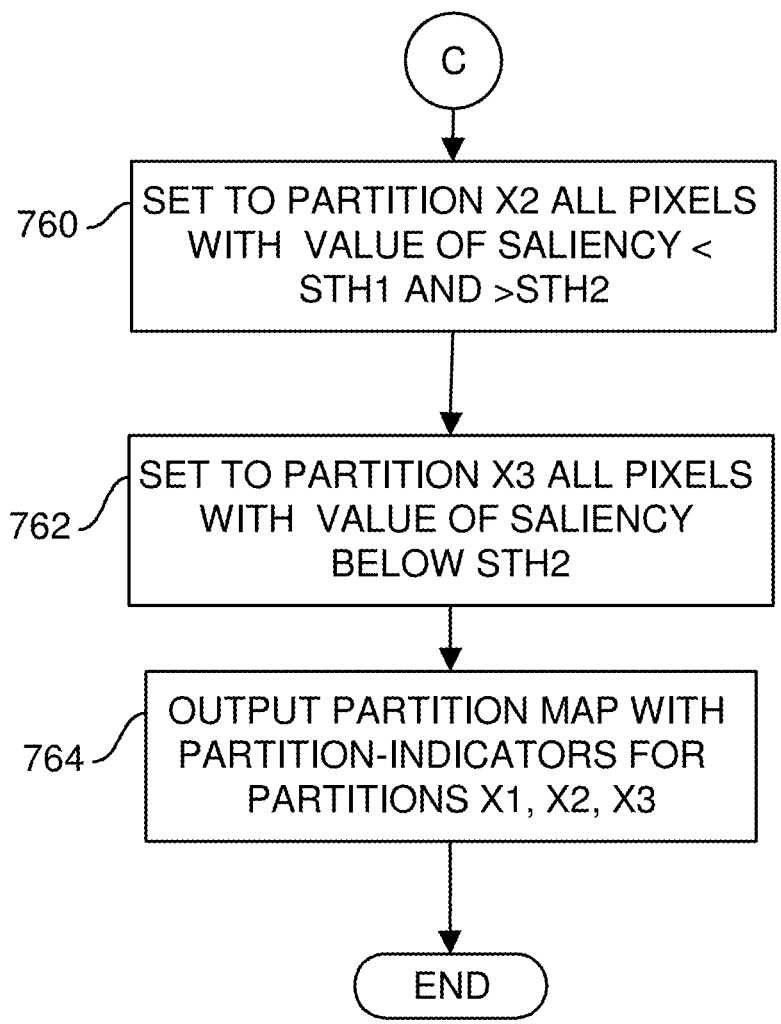

FIGS. 22A-22B show generating a partition map from a saliency map. Partition routine 702B uses saliency values for partitioning. The RGB image may be obtained from pre-processor 302, step 750. A saliency value is generated for each pixel location in the RGB image, step 752. Image processing may be used to generate these saliency values. The depth map may be one of several factors that are combined to generate the saliency value. Other factors can include color, brightness, sharpness or blurriness of edges, x,y location of the pixel, or even movement of objects from frame to frame in a video sequence.

A saliency map is generated from the calculated saliency values, step 752. At least two saliency thresholds STH1, STH2 are set, step 754. All pixel locations having a saliency value in the saliency map that is greater than first threshold STH1 are placed into first partition X1, step 756. The locations of these pixels in the partition map can be set to a first partition-indicator value, such as 1.

All pixel locations having a saliency value in the saliency map that is between first threshold STH1 and second threshold STH2 are placed into second partition X2, step 760. The locations of these pixels in the partition map can be set to a second partition-indicator value, such as 2. All pixel locations having a saliency value in the saliency map that is less than the second threshold STH2 are placed into third partition X3, step 762. The locations of these pixels in the partition map can be set to a third value, such as 3.

The resulting partition map that is output, step 764, has partition indicators for pixel locations set to 1, 2, or 3, based on the saliency values.

Figure 23A:
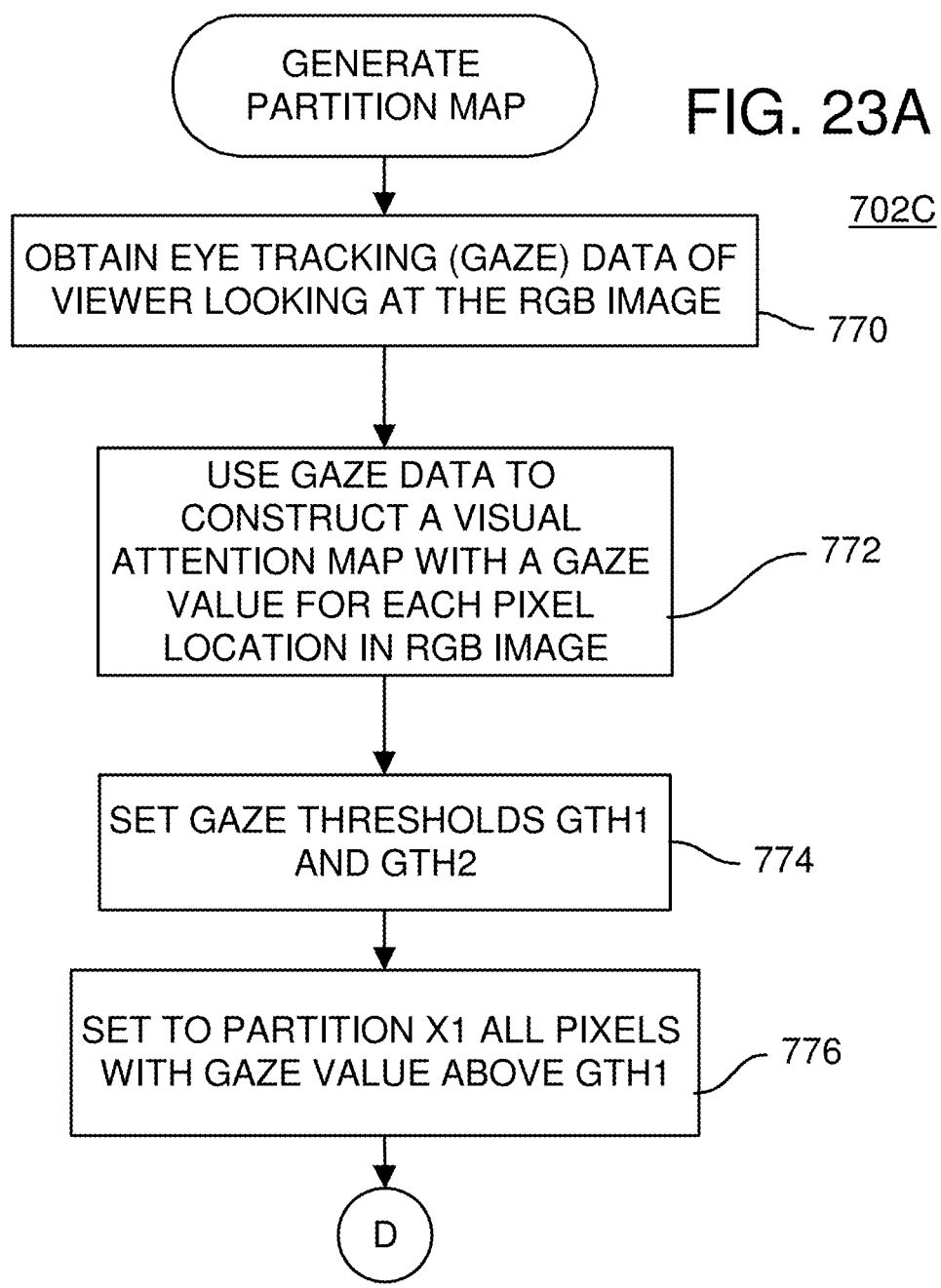
FIGS. 23A-23B show generating a partition map from a visual-attention map.
Figure 23B:
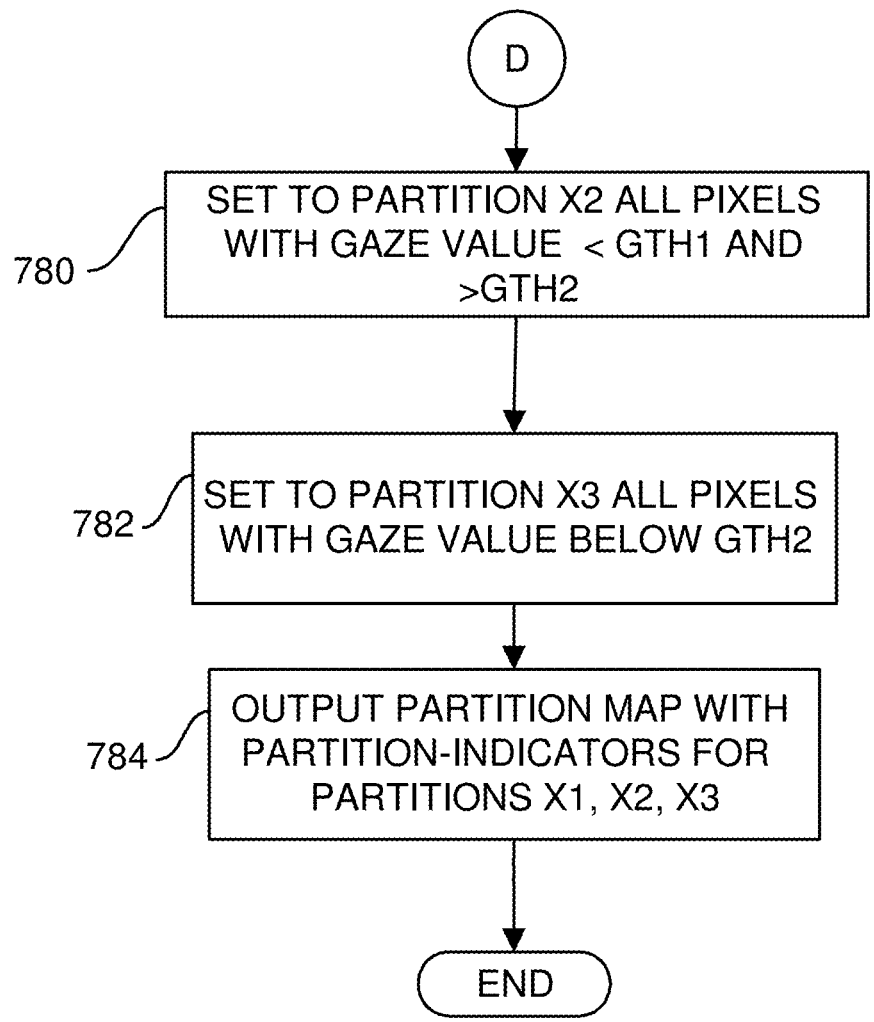

FIGS. 23A-23B show generating a partition map from a visual-attention map. Partition routine 702C uses eye-tracking or gaze values for partitioning. An eye tracker is used to determine where in the displayed image the viewer is looking. The eye tracker outputs eye tracking or gaze data, step 770. This gaze data is used to construct a visual attention map that has different gaze values for different pixel locations in the displayed image, step 772.

At least two gaze thresholds GTH1, GTH2 are set, step 774. All pixel locations having a gaze value in the visual attention map that is greater than first threshold GTH1 are placed into first partition X1, step 776, such as by setting the partition-indicator to 1 in the partition map.

All pixel locations having a gaze value in the visual attention map that is between first threshold GTH1 and second threshold GTH2 are placed into second partition X2, step 780, such as by setting the partition-indicator to 2 in the partition map.

Pixel locations having a gaze value in the visual attention map that is less than the second threshold GTH2 are placed into third partition X3, step 782. The locations of these pixels in the partition map can be set to a third value, such as 3. The resulting partition map that is output, step 784, has partition indicators for pixel locations set to 1, 2, or 3, based on the gaze values.

Figure 24A:
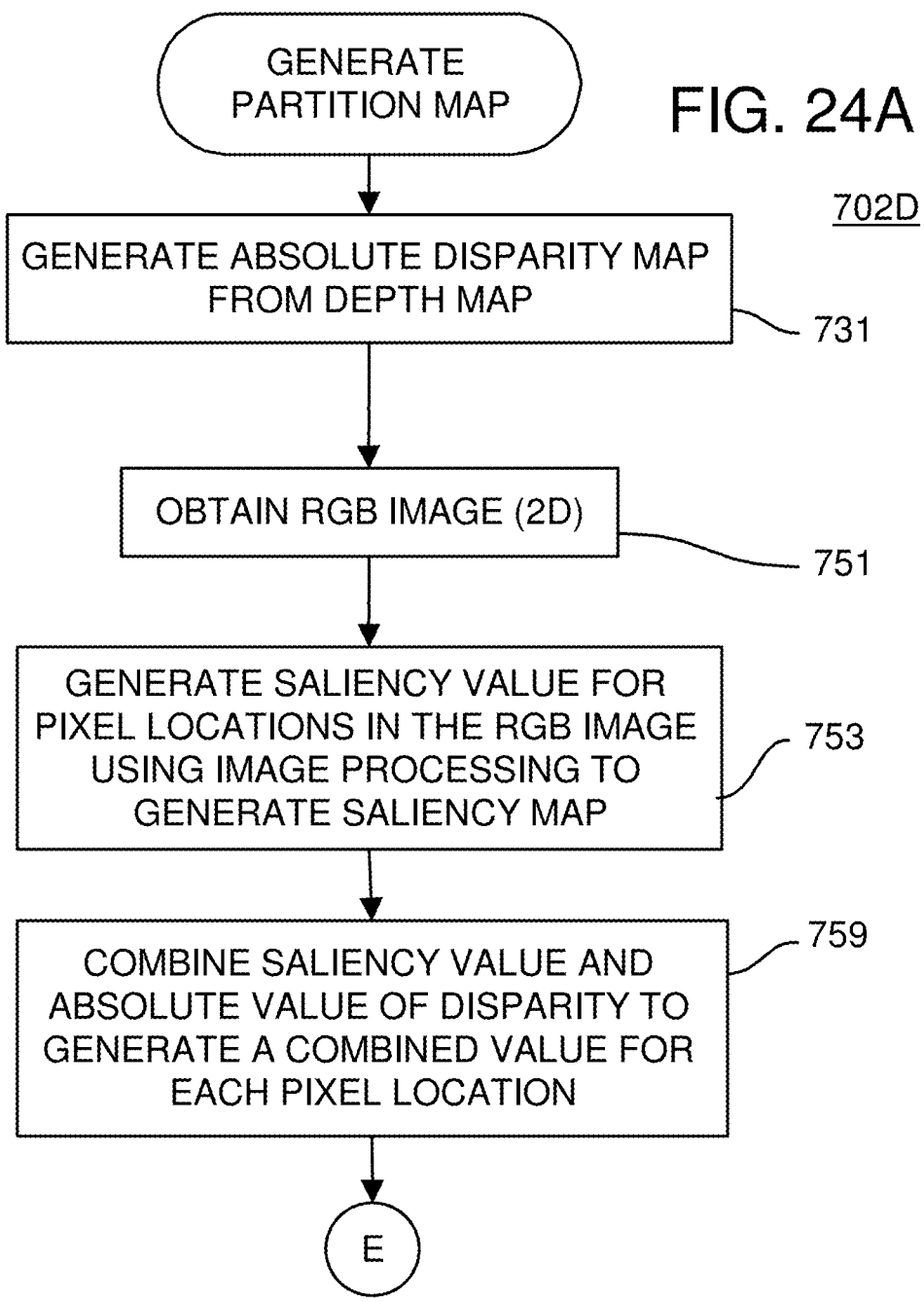
FIGS. 24A-24B show generating a partition map from a combination of the depth map and a saliency map.
Figure 24B:
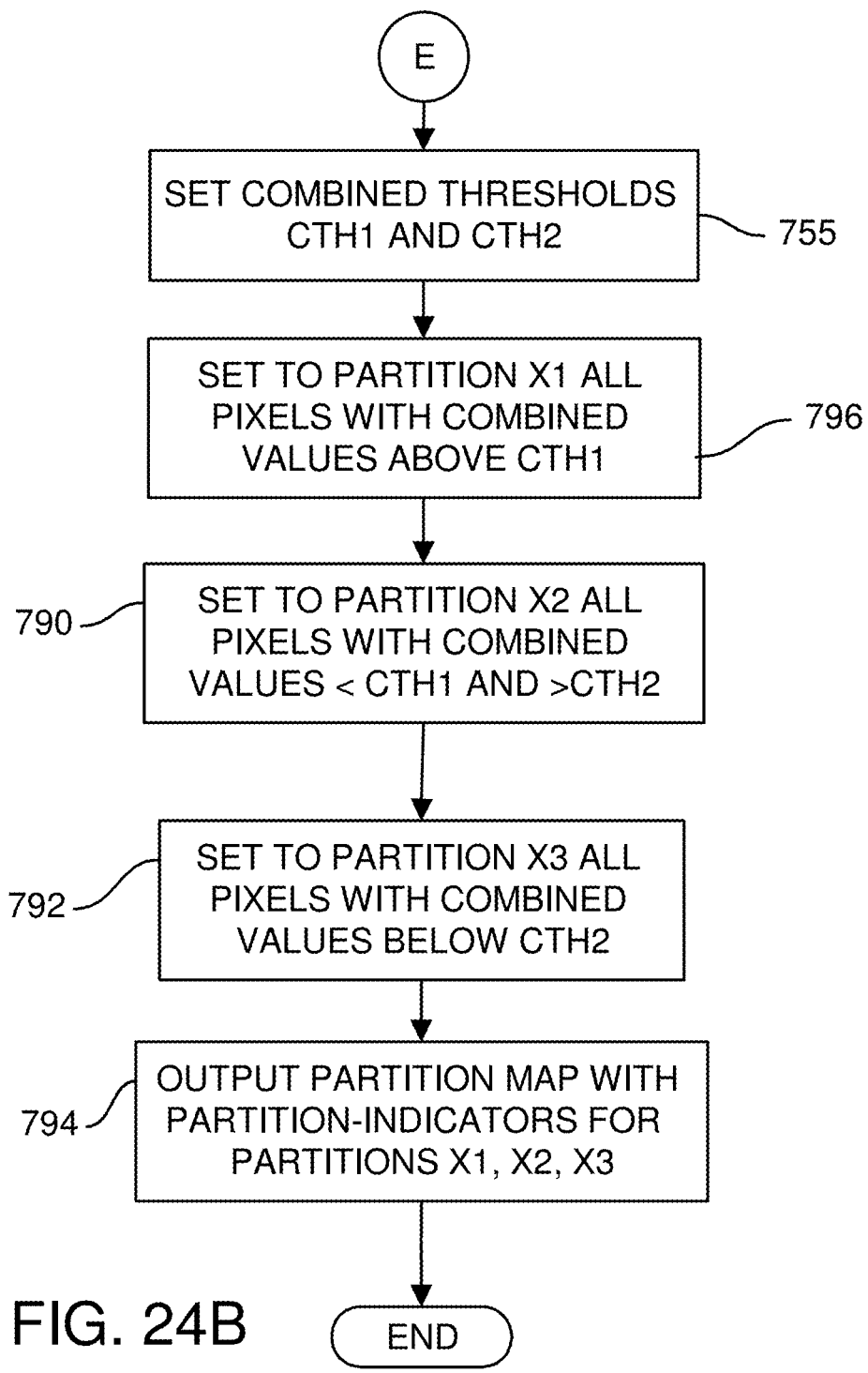

FIGS. 24A-24B show generating a partition map from a combination of the depth map and a saliency map. Partition routine 702D uses depth values and saliency values for partitioning. An absolute disparity map is generated from the depth map, step 730. The absolute disparity is the absolute parallax or shift of an object at a depth indicated by the depth map when projected onto screen 110 (FIGS. 3-4).

The RGB image may be obtained from pre-processor 302, step 751. A saliency value is generated for each pixel location in the RGB image, step 753. Image processing may be used to generate these saliency values based on color, edge sharpness, object shapes and locations, or other factors. A saliency map is generated from the calculated saliency values, step 753.

The saliency value from the saliency map and the absolute value of the disparity from the absolute disparity map are combined to generate a combined value, step 759. The combined value may be a weighted sum of the saliency value and the absolute disparity value, or other combination functions may be used. Eye tracking data, such as from a visual attention map, may also be combined into the combined value. A combined value is generated for each pixel location. The combined values may be stored in a combined-saliency map.

At least two combined-saliency thresholds CTH1, CTH2 are set, step 755. All pixel locations having a combined value in the combined-saliency map that is greater than first threshold CTH1 are placed into first partition X1, step 796. The locations of these pixels in the partition map can be set to a first partition-indicator value, such as 1.

All pixel locations having a combined value in the combined-saliency map that is between first threshold CTH1 and second threshold CTH2 are placed into second partition X2, step 790. The locations of these pixels in the partition map can be set to a second partition-indicator value, such as 2. All pixel locations having a combined value in the combined-saliency map that is less than the second threshold CTH2 are placed into third partition X3, step 792. The locations of these pixels in the partition map can be set to a third value, such as 3. The resulting partition map that is output, step 794, has partition indicators for pixel locations set to 1, 2, or 3, based on the combined values.

The 3D image displayed on the autostereoscopic display has very little reduction in quality due to reducing the number of view images for less-salient partitions when saliency generation is effective. The computing resources to generate the multi-view images can be reduced by almost half when using 3 partitions for a 28-view 3D system.

Alternate Embodiments

Several other embodiments are contemplated by the inventors. For example various pixel formats and bit depths may be used, and the depth values, saliency values, partition indicators could have various formats and bit depths. There may be more than one RGB input image, and more than one depth map. The depth map may be replaced by a disparity map. The terms segment, partition, and region have all been used to refer to portions of the full frame. These portions can be non-overlapping or overlapping.

Partitioning may be based on the depth values, or on modifications of the depth values such as disparity or absolute disparity. Disparity values may be directly available rather than depth values when a disparity map is generated or input rather than a depth map. Saliency may be based solely on the depth values, or may also detect foreground objects, shapes, contrast, lighting, motion vectors of objects, and eye gaze. Foreground objects or other objects with a high disparity can be displayed with the maximum number of view images, while background or low disparity objects can be displayed with a reduced number of view images. Other partitioning methods may be substituted, and various combinations are possible.

The depth values in the depth map, the saliency values in the saliency map, the eye tracking data in the eye position map, and the partition indicators in the partition map are values that refer to a pixel location. That pixel location can refer to a location for just one pixel, or can refer to a pixel location for a block of pixels. The granularity of the pixel location can be one pixel for the depth map, and 16 pixels for the partition map, and 64 pixels for the eye position map, as one possible example. Rather than have one depth, saliency, or gaze value for each pixel location, the depth, saliency, or gaze value may be for a block of pixels. The granularity of gaze and saliency does not have to be as fine-grained as the depth values. The depth values may be inverted or otherwise operated upon, so that darker values are closer to the viewer, or so that lighter values are closer to the viewer. The largest depth value can be assigned to the nearest objects in some depth maps. Saliency values may likewise be inverted.

While a saliency map, eye position map, depth map, and a partition map have been shown, with map values for each pixel location in the map that corresponds to a pixel location in the input image, these maps may be transitory and the full map may not be stored. Saliency values may be immediately compared to the saliency threshold and then the resulting partition indicator stored in the partition map without the need to store the saliency value in a saliency map.

While a segmented depth map has been shown that is combined with the segmented image to generate the segmented view images, the depth map does not have to be divided into segments, but a unified full-frame depth map can be read for depth values for the particular segment being processed. The segmented depth maps may be an abstraction while the physical depth values are stored together in a full-frame depth map. Likewise, the segmented images for different segments may be stored together in a larger image buffer, as could the segmented view images for different segments. Pointers or beginning and ending address registers could be used to maintain the separate segmented images stored within a large image buffer. All data could be stored in one large memory with different regions used for storing the various images.

While RGB pixel data has been described, the pixel data could be in various formats and data widths. For example, YUV pixel data could be used rather than RGB. Pixel data may be converted between various formats, such as YUV to RGB. Pixel values may also be inverted or complemented or otherwise operated upon. The size, format, and type of pixels may vary, such as RGB, YUV, 8-bit, 16-bit, or may include other effects such as texture or blinking.

Color pixels could be converted to gray scale for various processes, such as for searching in search windows with a query patch. Color systems could be converted during pre or post processing, such as between YUV and RGB, or between pixels having different bits per pixel. Various pixel encodings could be used, and frame headers and audio tracks could be added. GPS data or camera orientation data could also be captured and attached to the video stream.

Interlacing may be performed on whole pixels, or on sub-pixels. The interlacing pattern depends on the specifications of the autostereoscopic display, which can have 3D slots, barriers, or lenses of various shaped and sizes, that refract light from the displayed pixels to different viewer eye positions or viewpoints. The lenticular lens shape, size, pitch, and pattern on the autostereoscopic display can determine the interlacing pattern. The interlacing pattern can be vertical or horizontal columns, such as repeatedly spaced columns, or can have both vertical and horizontal parallax, such as caused by tilted lenticular lenses, hexagonal, and hemispherical lenses, which can have interlacing patterns with slanted or tilted columns. These autostereoscopic displays direct light from a subset of pixels or sub-pixels that belong to one view image toward one view position, while preventing other viewer positions from seeing these pixels.

While a flat autostereoscopic has been described, the autostereoscopic could have a curved surface or cylindrical shape. Rather than using rows and columns of equal sizes, the autostereoscopic display could have a polar coordinate system. As a viewer moved from one viewing position to the next viewing position, the viewer sees a different one of the view images. These adjacent view image can be generated to either amplify a 3D effect or to smooth changes when the viewer is himself in motion. The viewer eye positions or viewpoints may be separated by distances that are smaller than the width of the eye.

The threshold values for partitioning the depth map or saliency map may be adjusted, such as by a program, to adjust the tradeoff between the 3D image quality and the computing resources required for multi-view generation. While 2 thresholds and 3 partitions have been described, there could be just one threshold and two partitions, or there could be 3 thresholds and four partitions. Additional thresholds may be used to increase the number of partitions.

The maximum number of views does not have to be 28, but could be other values, and the reduced views could have values other than 14 and 7, possibly with other ratios. For example, 4 view images could be generated for the first partition, 2 views for the second partition, and just one view for the third partition. The multi views can be generated by shifting the location pixels the parallax map generated using the depth map, the zero-parallax plane, and the viewpoint locations.

The number of view images generated for a partition could be a dynamic number that can be programmable or changed during processing, such as to decrease the number of views generated for faster-motion video sequences but to allow more view images to be generated for slower moving, more static video sequences, of for more complex input images.

Various steps may be processed serially or in parallel. For example, steps 756, 760, and 762 of FIG. 22A-B could be performed in any order, or all 3 steps could be performed in parallel. Likewise, steps 776, 780, 782 in FIG. 23A-B could be processed serially or in parallel. Some steps may be combined with other steps or divided into sub-steps.

Computing resources are saved by not operating upon pixels having default (black) values in segmented RGB images 340, 342, 344. Storage requirements could also be reduced, such as by using fewer bits to store default pixels, or by storing a default-pixel indicator, and number of the black pixels in a row, rather than individually storing all of the black pixels. Other compression methods could be employed.

Pre-processor 302 may not be present in some embodiments. For example, the input image and the depth map may already be available when the input receives a RGB/Z image. A disparity map may be received that pre-processor 302 converts into a depth map. Multiple view images may be received by pre-processor 302 and converted to a single RGB image and a depth map, or the multiple view images may be used directly to generate more multiple view images without generating a single RGB image. Pre-processor 302 may perform whatever image format and depth conversions are necessary. Pre-processor 302 may generate a disparity map that is used in place of the depth map.

FIG. 12 shows one possible replication and interlacing scheme. Other re-arrangements, view labeling, and variations are possible. While replication and interlacing are described as being done before integrating, integrating could be performed before a final interlacing step. For example, the 7 view images could be expanded to 28 view images and then integrated with the 28 view images for all other segments to generate 28 full-frame view images. Then these 28 full-frame view images are interlaced to generate the final 3D image to the autostereoscopic display.

Rather than discrete operations, composite operations that perform more than one function could be substituted. Interlacing can be performed by a combination of masking, mapping, and muxing. A LUT can be used to implement mapping and muxing.

Integrating the segmented images may be performed by superposition of pixels from the segment images. When pixels outside of the partition are set to a zero or null value, the pixel values may be added together since only one partition will have a non-zero pixel value. Rather than store a value for each individual pixel in a segmented image, areas outside of the partition could be compressed, such as by storing a null pixel indicator and then a repeat value that indicates the number of null pixels in the row before the next pixel in the partition is encountered in the row. Other image compression schemes could be used.

The resolution of the input image, the segmented view images, the segmented interlaced 3D image, and the final 3D image that is output to the autostereoscopic display could have the same resolution, or could have different resolutions. Downsampling or upsampling could be performed, such as during interlacing. The autostereoscopic could interlace 28 view images where all pixels in the 28 view images are displayed, or where only a subset of the pixels are displayed. Each of the 28 views could have the same resolution as the input image, or interlacing could drop pixels to downsample to a lower resolution. When vertical lenticular lenses are used on the autostereoscopic display, and columns are interlaced, and no pixels are lost, there would be 28 columns for every original column in the input image. The row spacing could be expanded on the autostereoscopic display to account for squeezing in 28 columns of pixels for multi-view. Interlacing may use complex blending functions rather than selecting or dropping pixels. The 3D display may have a Liquid Crystal Display (LCD) or a Light-Emitting-Diode (LED) screen or may use one or more projectors. The 3D display itself may perform various interlacing or other functions on pixels before display.

Various other image processing may be combined with multi-view generation. Image filtering, averaging, sharpening or blurring, compressing, or stereo effects may be added. Various resolutions could be used, such as HD, 4K, etc., and pixels and sub-layers could be encoded and decoded in a variety of ways with different formats, bit widths, etc. Additional image processing such as for masks could be used, such as for facial recognition, image or object tracking, etc.

Various combinations of hardware, programmable processors, software, and firmware may be used to implement functions and blocks. Pipelining may be used, as may parallel processing. Various routines and methods may be used. Table lookups could be used to implement various functions, replacing runtime computations with a one-step lookup.

While images have been shown, the appearances of any errors or artifacts may vary greatly with the image itself, as well as with the processing methods, including any pre-processing. Such images that are included in the drawings are merely to better understand the problems involved and how the inventor solves those problems and are not meant to be limiting or to define the invention.

Directional terms such as up, down, above, below, upper, lower, right, left, are used for better understanding the invention, and can be interchangeable, such as by flipping the image over or reversing the image, projection, or memory space. Thus these directional terms are not meant to be limiting.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A reduced-load multi-view 3D image generator comprising:
   an input that receives an input image and a depth map for the input image;
   a partitioner that generates a partition map, the partition map having K partition indicators for pixel locations in the input image, a partition indicator for indicating that a pixel at a pixel location is assigned to one of K partitions;
   a segmenter that merges the partition map with the input image to generate a K segmented images;
   a multi-view generator that generates multiple view images for display on an autostereoscopic display to viewers at different viewpoints to provide a 3D effect, wherein pixels are shifted by a different parallax value for different multiple view images to create the 3D effect for the different viewing eye positions;
   wherein the multi-view generator shifts pixels in the first of the K segmented images to generate M first segmented view images, and shifts pixels in a second of the K segmented images to generate N second segmented view images, and shifts pixels in a third of the K segmented images to generate P third segmented view images when K is at least 3;
   wherein K, M, N, and P are whole numbers, and M is greater than N, and N is greater than P, and K is at least 2;
   a view expander that generates M-N additional second segmented view images from the N second segmented view images to generate M second segmented view images;
   wherein the view expander further generates M-P additional third segmented view images from the P third segmented view images to generate M third segmented view images when K is at least 2;
   a view interlacer and integrator that interlaces pixels from multiple view images for multiple segments into an interlaced image in an interlacing pattern that allows the autostereoscopic display to display the multiple view images to the different viewing eye positions;
   wherein the view interlacer and integrator integrating and interlacing pixels from the M first segmented view images, from the M second segmented view images, and from the M third segmented view images into an interlaced display image for display on the autostereoscopic display, whereby the multi-view generator generates M-N and M-P fewer segmented view images to reduce computational load.

2. The reduced-load multi-view 3D image generator of claim 1 wherein a pixel has a red sub-pixel, a green sub-pixel, and a blue sub-pixel;

wherein the view interlacer and integrator interlaces sub-pixels from different pixels to generate the interlaced display image;

wherein the autostereoscopic display is sub-pixel interlaced.

3. The reduced-load multi-view 3D image generator of claim 1 further comprising:

a depth-map segmenter that merges the partition map with the depth map to generate K segmented depth maps that are non-overlapping, wherein each depth map contains depth values;

wherein the K segmented images are non-overlapping;

wherein the multi-view generator generates the parallax values from depth values and from the different viewing eye positions, a first of the K segmented depth maps being used to create the parallax values for generating the M first segmented view images, a second of the K segmented depth maps being used to create the parallax values for generating the N second segmented view images, and a third of the segmented depth maps being used to create the parallax values for generating the P third segmented view images, whereby the depth map is also segmented.

4. The reduced-load multi-view 3D image generator of claim 1 wherein the partitioner compares a depth value for a pixel location in the depth map to one or more depth thresholds in a plurality of K−1 depth thresholds, and sets a partition indicator for the pixel location in response to a comparison result.

5. The reduced-load multi-view 3D image generator of claim 1 further comprising:

a saliency generator that generates a saliency map having saliency values generating by processing the input image and the depth map to detect salient image features that include one or more of color, color contrast, depth value, blurriness, eye gaze, motion vectors, and surrounding image features;

the partitioner comparing a saliency value for a pixel location in the saliency map to a first saliency threshold in a plurality of K−1 saliency thresholds, and setting the partition indicator for the pixel location to indicate one of the K partitions in response to saliency threshold comparison results.

6. A segmented multi-view image generator comprising:

an image input for receiving an input image and a depth map, the depth map indicating depths or disparities of pixel locations in the input image;

a partitioner that generates a partition map from the depth map, the partition map having partition indicators for the pixel locations in the input image, the partition indicators indicating a partition for the pixel location, the partition being a first partition or a second partition;

a segmenter that generates a first segmented image by removing from the input image pixels in pixel locations that do not have the partition indicator indicating the first partition to generate the first segmented image, the segmenter also generating a first segmented depth map by removing from the depth map depth values for pixel locations that do not have the partition indicator indicating the first partition to generate the first segmented depth map;

wherein the segmenter also generates a second segmented image by removing from the input image pixels in pixel locations that do not have the partition indicator indicating the second partition to generate the second segmented image, the segmenter also generating a second segmented depth map by removing from the depth map depth values for pixel locations that do not have the partition indicator indicating the second partition to generate the second segmented depth map;

a multi-view generator that generates a first plurality of first segmented view images by shifting pixels in the first segmented image by a shift amount determined from a depth value for the pixel location from the first segmented depth map, the multi-view generator also generating a second plurality of second segmented view images by shifting pixels in the second segmented image by a shift amount determined from the depth value for the pixel location from the second segmented depth map;

wherein each first segmented view image in the first plurality of first segmented view images has a different value of a view identifier;

wherein the first plurality of first segmented view images has M first segmented view images and has M values of the view identifier, wherein M is a whole number of at least 4;

wherein each second segmented view image in the second plurality of second segmented view images has a different value of the view identifier;

wherein the second plurality of second segmented view images has N second segmented view images and has N values of the view identifier, wherein N is a whole number that is less than M;

wherein the multi-view generator generates a reduced number view images for the second segmented view images;

a view expander that receives the second plurality of second segmented view images and generates M−N additional second segmented view images from the second plurality of second segmented view images to generate an expanded second plurality of second segmented view images having M values of the view identifier;

a view interlacer that generates an interlaced first segmented image from the first plurality of first segmented view images by placing pixels from the first segmented view image into pixel locations in the interlaced first segmented image that are visible to a viewer identified by the view identifier for the first segmented view image, and not visible to other viewers identified by other view identifiers when the interlaced first segmented image is displayed on an autostereoscopic display, wherein pixels from all M first segmented view images are interlaced together to form the interlaced first segmented image that is visible to M different viewers at M different view locations when displayed on the autostereoscopic display;

wherein the view interlacer also generates an interlaced second segmented image from the second plurality of second segmented view images by placing pixels from the second segmented view image into pixel locations in the interlaced second segmented image that are visible to a viewer identified by the view identifier for the second segmented view image, and not visible to other viewers identified by other view identifiers when the interlaced second segmented image is displayed on an autostereoscopic display, wherein pixels from all M second segmented view images in the expanded second plurality are interlaced together to form the interlaced second segmented image that is visible to M different viewers at M different view locations when displayed on the autostereoscopic display; and a segment integrator that superimposes the interlaced first segmented image and the interlaced second segmented image to generate an interlaced image for display on the autostereoscopic display;

wherein the multi-view generator generates a reduced number of view images for the second segmented view images than for the first segmented view images to reduce computational load.

7. The segmented multi-view image generator of claim 6 wherein the view expander replicates second segmented view images in the second plurality of second segmented view images to generate the M-N additional second segmented view images.

8. The segmented multi-view image generator of claim 6 wherein the view expander interpolates between pairs of second segmented view images in the second plurality of second segmented view images to generate the M-N additional second segmented view images.

9. The segmented multi-view image generator of claim 6 wherein the shift amount is also determined by a viewer's eye location that is indicated by a view identifier;
wherein each first segmented view image in the plurality of first segmented view images is for a different view identifier indicating a different viewer's eye location;
wherein each second segmented view image in the plurality of second segmented view images is for a different view identifier indicating a different viewer's eye location.

10. The segmented multi-view image generator of claim 9 wherein the partitioner generates the partition map by comparing a depth value from the depth map to a depth threshold and setting the partition indicator in the partition map for the pixel location of the depth value to indicate the first partition when the depth value is less than the depth threshold and otherwise setting the partition indicator to indicate the second partition;
whereby depth values are compared to the depth threshold to set partitions.

11. The segmented multi-view image generator of claim 9 further comprising:
an absolute disparity generator that generates an absolute disparity map from the depth map by adjusting depth values for a screen depth of the autostereoscopic display to generate absolute disparity values written into the absolute disparity map;
wherein the partitioner generates the partition map by comparing an absolute disparity value from the absolute disparity map to an absolute disparity threshold and setting the partition indicator in the partition map for the pixel location of the absolute disparity value to indicate the first partition when the absolute disparity value is greater than the absolute disparity threshold and otherwise setting the partition indicator to indicate the second partition;
whereby absolute disparity values are compared to the absolute disparity threshold to set partitions.

12. The segmented multi-view image generator of claim 9 further comprising:

a saliency generator that generates a saliency map, the saliency generator analyzing the input image and the depth map to assign saliency values for pixel locations in the input image, the saliency generator writing the saliency values to the saliency map;
wherein the partitioner generates the partition map by comparing a saliency value from the saliency map to a saliency threshold and setting the partition indicator in the partition map for the pixel location of the saliency value to indicate the first partition when the saliency value is greater than the saliency threshold and otherwise setting the partition indicator to indicate the second partition;
whereby saliency values are compared to the saliency threshold to set partitions.

13. The segmented multi-view image generator of claim 12 wherein the saliency generator generates the saliency values as a function of two or more of a pixel color, contrast of the pixel color to the pixel color of other pixels in the input image, edge detection, the pixel location relative to frame borders of the input image, the depth value, and motion vectors for the pixel.

14. The segmented multi-view image generator of claim 12 further comprising:
an eye tracker that measures an eye position of a viewer of the input image or of a viewer of the interlaced image displayed on the autostereoscopic display;
the partitioner increasing the saliency values for pixel locations that the eye tracker detects that the viewer is gazing at.

15. The segmented multi-view image generator of claim 9 wherein M is 28 view images and N is 7 or 14 view images.

16. The segmented multi-view image generator of claim 9 wherein the partition indicator also indicates a third partition;
wherein the segmenter also generates a third segmented image by removing from the input image pixels in pixel locations that do not have the partition indicator indicating the third partition to generate the third segmented image, the segmenter also generating a third segmented depth map by removing from the depth map depth values for pixel locations that do not have the partition indicator indicating the third partition to generate the third segmented depth map;
wherein the multi-view generator also generates a third plurality of third segmented view images by shifting pixels in the third segmented image by a shift amount determined from the depth value for the pixel location from the third segmented depth map;
wherein each third segmented view image in the third plurality of third segmented view images has a different value of the view identifier;
wherein the third plurality of third segmented view images has P third segmented view images and has P values of the view identifier, wherein P is a whole number that is less than M and less than N;
wherein the multi-view generator generates a reduced number view images for the third segmented view images;
wherein the view expander also receives the third plurality of third segmented view images and generates M-P additional third segmented view images from the third plurality of second segmented view images to generate an expanded third plurality of third segmented view images having M values of the view identifier;

wherein the view interlacer also generates an interlaced third segmented image from the third plurality of third segmented view images by placing pixels from the third segmented view image into pixel locations in the interlaced third segmented image that are visible to a viewer identified by the view identifier for the third segmented view image, and not visible to other viewers identified by other view identifiers when the interlaced third segmented image is displayed on an autostereoscopic display, wherein pixels from all M second segmented view images in the expanded third plurality are interlaced together to form the interlaced second segmented image that is visible to M different viewers at M different view locations when displayed on the autostereoscopic display; and the segment integrator superimposes the interlaced first segmented image and the interlaced second segmented image and the interlaced third segmented image to generate the interlaced image for display on the autostereoscopic display;

wherein the multi-view generator generates a reduced number of view images for the third segmented view images than for the first segmented view images to further reduce computational load.

17. A segmented multi-view rendering method comprising:

generating a partition map having at least two partitions;

for each partition, generate a segmented image for that partition that has pixels only at pixel locations indicated for that partition in the partition map, the pixels being copied from pixel locations in an input image;

receiving a depth map having depth values for pixel locations in the input image, wherein the depth values indicate a disparity or a depth of a pixel at the pixel location;

generating a full set of M view images from the segmented image for a first partition;

generating a reduced set of N view images from the segmented image for a second partition;

wherein M and N are whole numbers, and M is greater than N;

wherein the M view images are generated using a parallax shift that is a function of the depth values and a viewpoint, wherein the viewpoint is different for each of the M view images;

generating M–N replicated view images from the reduced set of N view images to generate an expanded set of view images for the second partition;

interlacing pixels from the full set of M view images for the first partition to generate an interlaced first image;

interlacing pixels from the expanded set of view images for the second partition to generate an interlaced second image;

integrating the interlaced first image and the interlaced second image to generate a 3D display image; and sending the 3D display image to an autostereoscopic display that generates M view images to M viewpoints from the 3D display image.

18. The segmented multi-view rendering method of claim 17 further comprising:

generating saliency values for pixel locations in the input image by processing the input image and the depth map to detect salient image features that include one or more of color, color contrast, depth value, blurriness, eye gaze, motion vectors, and surrounding image features;

comparing a saliency value to a first saliency threshold, and setting a partition indicator in the partition map for the pixel location to indicate the first partition when the saliency value is greater than the first saliency threshold, and to indicate the second partition when the saliency value is less than the first saliency threshold.

19. The segmented multi-view rendering method of claim 17 wherein the pixels are RGB pixels each composed of Red, Green, and Blue sub-pixels;

wherein interlacing pixels further comprises interlacing sub-pixels, wherein sub-pixels are interlaced with an interlace pattern defined by the autostereoscopic display to allow sub-pixels at different physical locations on the autostereoscopic display to be viewable by only one viewpoint and not viewable at M–1 other viewpoints.

20. The segmented multi-view rendering method of claim 17 wherein M is 28 and N is 14 and P is 7.

* * * * *